United States Patent
Alshina et al.

(10) Patent No.: US 11,638,006 B2
(45) Date of Patent: Apr. 25, 2023

(54) METHOD AND DEVICE FOR ENCODING OR DECODING IMAGE

(71) Applicant: SAMSUNG ELECTRONICS CO., LTD., Suwon-si (KR)

(72) Inventors: Elena Alshina, Suwon-si (KR); Mikhail Mishurovskiy, Moscow (RU); Alexander Alshin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 19 days.

(21) Appl. No.: 17/167,866

(22) Filed: Feb. 4, 2021

(65) Prior Publication Data

US 2021/0258579 A1   Aug. 19, 2021

Related U.S. Application Data

(63) Continuation of application No. 15/767,307, filed as application No. PCT/KR2016/011497 on Oct. 13, 2016, now Pat. No. 10,939,104.

(Continued)

(51) Int. Cl.
*H04N 19/91* (2014.01)
*H04N 19/44* (2014.01)
(Continued)

(52) U.S. Cl.
CPC ......... *H04N 19/124* (2014.11); *H04N 19/109* (2014.11); *H04N 19/11* (2014.11);
(Continued)

(58) Field of Classification Search
CPC .......................... H04N 19/124; H04N 19/109
See application file for complete search history.

(56) References Cited

U.S. PATENT DOCUMENTS 7,932,843 B2 *   4/2011   Demircin .............. H04N 19/13
                                                        341/107
8,200,035 B2     6/2012   Koroteev et al.
(Continued)

FOREIGN PATENT DOCUMENTS

CN    101005287 A    7/2007
CN    102231830 A    11/2011
(Continued)

OTHER PUBLICATIONS

Communication dated May 21, 2021 issued by the Korean Intellectual Property Office in application No. 10-2017-7037707.
(Continued)

*Primary Examiner* — Irfan Habib
(74) *Attorney, Agent, or Firm* — Sughrue Mion, PLLC

(57) ABSTRACT

An image decoding method and apparatus according to an embodiment may extract, from a bitstream, a quantization coefficient generated through core transformation, secondary transformation, and quantization; generate an inverse-quantization coefficient by performing inverse quantization on the quantization coefficient; generate a secondary inverse-transformation coefficient by performing secondary inverse-transformation on a low frequency component of the inverse-quantization coefficient, the secondary inverse-transformation corresponding to the secondary transformation; and perform core inverse-transformation on the secondary inverse-transformation coefficient, the core inverse-transformation corresponding to the core transformation.

2 Claims, 27 Drawing Sheets

Related U.S. Application Data

(60) Provisional application No. 62/240,725, filed on Oct. 13, 2015.

(51) Int. Cl.

| | | |
|---|---|---|
| *H04N 19/61* | (2014.01) | |
| *H04N 19/137* | (2014.01) | |
| *H04N 19/51* | (2014.01) | |
| *H04N 19/124* | (2014.01) | |
| *H04N 19/122* | (2014.01) | |
| *H04N 19/182* | (2014.01) | |
| *H04N 19/126* | (2014.01) | |
| *H04N 19/70* | (2014.01) | |
| *H04N 19/194* | (2014.01) | |
| *H04N 19/11* | (2014.01) | |
| *H04N 19/109* | (2014.01) | |
| *H04N 19/18* | (2014.01) | |
| *H04N 19/537* | (2014.01) | |
| *H04N 19/46* | (2014.01) | |
| *H04N 19/593* | (2014.01) | |
| *H04N 19/63* | (2014.01) | |
| *H04N 19/13* | (2014.01) | |
| *H04N 19/436* | (2014.01) | |
| *H04N 19/139* | (2014.01) | |
| *H04N 19/176* | (2014.01) | |
| *H04N 19/513* | (2014.01) | |
| *H04N 19/57* | (2014.01) | |

(52) U.S. Cl.
CPC ......... *H04N 19/122* (2014.11); *H04N 19/126* (2014.11); *H04N 19/13* (2014.11); *H04N 19/137* (2014.11); *H04N 19/139* (2014.11); *H04N 19/176* (2014.11); *H04N 19/18* (2014.11); *H04N 19/182* (2014.11); *H04N 19/194* (2014.11); *H04N 19/436* (2014.11); *H04N 19/44* (2014.11); *H04N 19/45* (2014.11); *H04N 19/46* (2014.11); *H04N 19/51* (2014.11); *H04N 19/513* (2014.11); *H04N 19/537* (2014.11); *H04N 19/57* (2014.11); *H04N 19/593* (2014.11); *H04N 19/61* (2014.11); *H04N 19/63* (2014.11); *H04N 19/70* (2014.11); *H04N 19/91* (2014.11)

(56) References Cited

U.S. PATENT DOCUMENTS

| | | | |
|---|---|---|---|
| 8,374,244 B2 | 2/2013 | Lee et al. | |
| 8,929,673 B2 | 1/2015 | Alshina et al. | |
| 9,014,260 B2 | 4/2015 | Alshin et al. | |
| 9,130,585 B2* | 9/2015 | Marpe | H03M 7/607 |
| 9,363,510 B2 | 6/2016 | Sole Rojals et al. | |
| 9,379,736 B2 | 6/2016 | Sole Rojals et al. | |
| 9,402,079 B2 | 7/2016 | Alshina et al. | |
| 9,432,663 B2 | 8/2016 | Lim et al. | |
| 9,521,433 B2* | 12/2016 | Chono | H04N 19/196 |
| 9,661,326 B2 | 5/2017 | Alshin et al. | |
| 9,681,133 B2* | 6/2017 | Chan | H04N 19/90 |
| 10,142,635 B2* | 11/2018 | He | H04N 19/13 |
| 10,148,961 B2* | 12/2018 | Zhang | H04N 19/46 |
| 10,257,517 B2 | 4/2019 | Lee et al. | |
| 2008/0001796 A1 | 1/2008 | Oshikiri et al. | |
| 2009/0196355 A1* | 8/2009 | Kao | H04N 19/436 375/240.25 |
| 2010/0007534 A1* | 1/2010 | Girardeau, Jr. | H04N 19/44 341/107 |
| 2011/0228858 A1* | 9/2011 | Budagavi | H04N 19/61 375/E7.027 |
| 2011/0255798 A1 | 10/2011 | Fujino et al. | |
| 2012/0081241 A1* | 4/2012 | Misra | H04N 19/197 341/107 |
| 2012/0163469 A1 | 6/2012 | Kim et al. | |
| 2012/0300839 A1* | 11/2012 | Sze | H04N 19/91 375/E7.243 |
| 2013/0083851 A1 | 4/2013 | Alshin et al. | |
| 2013/0107951 A1* | 5/2013 | Sole Rojals | H04N 19/13 375/E7.243 |
| 2013/0223528 A1* | 8/2013 | Lim | H04N 19/436 375/240.12 |
| 2013/0230097 A1* | 9/2013 | Sole Rojals | H04N 19/18 375/240.02 |
| 2013/0300591 A1* | 11/2013 | Marpe | H03M 7/4006 341/67 |
| 2014/0169445 A1* | 6/2014 | Jahanghir | H04N 19/61 375/240.01 |
| 2014/0177708 A1* | 6/2014 | Alshin | H04N 19/50 375/240.12 |
| 2014/0247866 A1 | 9/2014 | Lee et al. | |
| 2015/0169794 A1 | 6/2015 | Maennel | |
| 2015/0350671 A1 | 12/2015 | Alshin et al. | |
| 2016/0007046 A1* | 1/2016 | Chou | H04N 19/13 375/240.02 |
| 2016/0353110 A1* | 12/2016 | Zhang | H04N 19/126 |
| 2017/0339413 A1* | 11/2017 | Alshin | H04N 19/34 |
| 2018/0278946 A1* | 9/2018 | Said | H04N 19/70 |
| 2019/0042956 A1* | 2/2019 | Huang | G06F 16/24578 |
| 2019/0110080 A1* | 4/2019 | Said | H04N 19/13 |
| 2020/0322610 A1* | 10/2020 | Leleannec | H04N 19/96 |

FOREIGN PATENT DOCUMENTS

| | | |
|---|---|---|
| CN | 103563381 A | 2/2014 |
| CN | 103746731 A | 4/2014 |
| CN | 103797803 A | 5/2014 |
| CN | 104137542 A | 11/2014 |
| CN | 104883569 A | 9/2015 |
| EP | 2 464 017 A1 | 6/2012 |
| JP | 2010237151 A | 10/2010 |
| KR | 10-2008-0064010 A | 7/2008 |
| KR | 10-2009-0034574 A | 4/2009 |
| KR | 1020100004037 A | 1/2010 |
| KR | 10-2011-0014839 A | 2/2011 |
| KR | 1020110112240 A | 10/2011 |
| KR | 10-2013-0003297 A | 1/2013 |
| KR | 10-2014-0126415 A | 10/2014 |
| WO | 2012167103 A1 | 12/2012 |
| WO | 2016/196287 A1 | 12/2016 |

OTHER PUBLICATIONS

JCT-VC, "Test Model under Consideration", Joint Collaborative Team on Video Coding (JCT-VC) of ITU-T SG16 WP3 and ISO/IEC JTC1/SC239/WG11, 1st Meeting: Dresden, DE, Apr. 15, 2010 thru Apr. 23, 2010, Document: JCTVC-A205, pp. 1-153, XP030007586.

Youji Shibahara et al., "Mode Dependent 2-step Transform for Intra Coding", Joint Collaborative Team on Video Coding (JCT-VC) of ITU-T SG16 WP3 and ISO/IEC JTC1/SC29/WG11, 4th Meeting Daegu, KR, Jan. 20, 2011 thru Jan. 28, 2011, Document: JCTVC-D151, WG11 No. m18903, pp. 1-7, XP030008191A.

Zhan Ma et al., "Non-CE 7: Experimental Results for the ROT", Joint Collaborative Team on Video Coding (JCT-VC) of ITU-T SG16 WP3 and ISO/IEC JTC1/SC29/WG11, 8th Meeting: San Jose, USA, Feb. 1, 2012 thru Feb. 10, 2012, Document: JCTVC-H0456, pp. 1-21, XP030051857.

Communication dated Mar. 15, 2017 by the International Searching Authority in counterpart International Patent Application No. PCT/KR2016/011497. (PCT/ISA/210 and PCT/ISA/237).

Communication dated May 28, 2018 by the European Patent Office in counterpart European Patent Application No. 16855742.9.

Office Action dated May 7, 2019 by the European patent Office in counterpart European Patent Application No. 16855742.9.

Alshin, A., et al., "Multi-parameter probability up-date for CABAC", Joint Collaborative Team on Video Coding (JCT-VC) of ITU-T

(56) References Cited

OTHER PUBLICATIONS

SG16 WP3 and ISO/IEC JTC/SC29/WG11, 6th Meeting: Torino, Jul. 14-22, 2011, XP030009277, pp. 1-5.

McCann, K., et al., "Description of high efficiency scalable video coding technology proposal by Samsung and Vidyo", Joint Collaborative Team on Video Coding (JCT-VC) of ITU-T SG16 WP3 and ISO/IEC JTC1/SC29/WG11, Oct. 10-19, 2012, XP030112976, pp. 1-31.

Alshin, A., et al., "CE1 (subset B); Multi-parameter probability up-date for CABAC", Joint Collaborative Team on Video Coding (JCT-VC) of ITU-T SG16 WP3 and ISO/IEC JTC1/SC29/WG11, Nov. 21-30, 2011, pp. 1-4, XP030110748.

Communication dated Feb. 19, 2020 from the European Patent Office in application No. 19207504.2.

Chen, Jianle et al., "Further improvements to HMKTA-1.0", ITU—Telecommunications Standardization Sector, Study Group 16 Question 6, Video Coding Experts Group (VCEG), 52nd Meeting: Jun. 19, 2015-Jun. 26, 2015, Document: VCEG-AZ07. (8 paged total).

Communication dated Oct. 1, 2020 by the European patent office in counterpart European Patent Application No. 19207504.2.

Communication dated Nov. 19, 2020 by the State Intellectual Property Office in P.R. China in counterpart Chinese Patent Application No. 201680059343.2.

Communication dated Mar. 30, 2022 issued by the State Intellectual Property Office of the P.R.China in application No. 202110145731.5.

Communication dated Mar. 30, 2022 issued by the State Intellectual Property Office of the P.R.China in application No. 20211014952.4.

Communication dated Mar. 30, 2022 issued by the State Intellectual Property Office of the P.R.China in application No. 202110171292.5.

Communication dated Dec. 14, 2022 issued by the Korean Patent Office in application No. 10-2022-7040175.

* cited by examiner

FIG. 26

| 2M | α | Fm(α) |
|---|---|---|
| 4 | 0 | { -24, -7, 40, -10,}, |
| 4 | 1/4 | { -8, -36, 54, -10,}, |
| 4 | 1/2 | { -4, -53, 53, -4,}, |
| 4 | 3/4 | { 10, -54, 36, 8,}, |
| 6 | 0 | { 8, -35, -3, 42, -16, 5,}, |
| 6 | 1/4 | { 4, -14, -34, 56, -16, 4,} |
| 6 | 1/2 | { -1, 5, -53, 53, -5, 1,} |
| 6 | 3/4 | { -4, 16, -56, 34, 14, -4,} |
| 8 | 0 | { -4, 14, -39, -2, 42, -18, 9, -3,} |
| 8 | 1/4 | { -2, 7, 16, -33, 56, -18, 8, -2,} |
| 8 | 1/2 | { 0, -2, 5, -54, 54, -5, 2, 0,} |
| 8 | 3/4 | { 2, -8, 18, -56, 33, 16, -7, 0,}, |
| 10 | 0 | {2, -8, 17, -40, -1, 42, -19, 11, -6, 2,}, |
| 10 | 1/4 | {1, -5, 9, -17, -33, 56, -19, 9, -5, 2,}, |
| 10 | 1/2 | { 0, 1, -2, 6, -54, 54, -6, 2, -1, 0,} |
| 10 | 3/4 | {-2, 5, -9, 19, -56, 33, 17, -9, 5, -1,}, |
| 12 | 0 | {-2, 5, -10, 18, -41, -1, 42, -20, 12, -7, 4, -1,}, |
| 12 | 1/4 | { 3, -6, 10, -17, -33, 57, -19, 10, -6, 3, -1,}, |
| 12 | 1/2 | {0, 1, -2, 6, -54, 54, -6, 2, -1, 0, 0,}, |
| 12 | 3/4 | {1, -3, 6, -10, 19, -57, 33, 17, -10, 6, -3, 1,} |

METHOD AND DEVICE FOR ENCODING OR DECODING IMAGE

CROSS-REFERENCE TO RELATED APPLICATIONS

This application is a Continuation Application of U.S. application Ser. No. 15/767,307 filed on Apr. 10, 2018, which is a National Stage Application of International Application No. PCT/KR2016/011497, filed on Oct. 13, 2016, which claims the benefit of U.S. Provisional Application No. 62/240,725 filed on Oct. 13, 2015, the disclosures of which are incorporated herein by reference in their entireties.

TECHNICAL FIELD

The present disclosure relates to image encoding and decoding methods and apparatuses, and more particularly, to image encoding and decoding methods and apparatuses which further efficiently perform prediction, motion compensation, transformation, and entropy coding.

BACKGROUND ART

Image data is encoded by a codec based on a predetermined data compression standard, e.g., the Moving Picture Expert Group (MPEG) standard, and then is stored in the form of a bitstream in a recording medium or is transmitted via a communication channel.

As hardware for reproducing and storing high resolution or high quality image content is being developed and supplied, a need for a codec for effectively encoding or decoding the high resolution or high quality image content is increasing. Encoded image content may be decoded to be reproduced. Recently, methods of efficiently compressing high resolution or high quality image content are being performed. For example, an efficient image compressing method is performed by randomly processing an encoding-target image.

DETAILED DESCRIPTION OF THE INVENTION

Technical Problem

Provided are an image encoding method or an image decoding method and an image encoding apparatus or an image decoding apparatus, which are aimed to increase an image compression rate.

Technical Solution

In accordance with an aspect of the present disclosure, an image decoding method includes extracting, from a bitstream, a quantization coefficient generated through core transformation, secondary transformation, and quantization; generating an inverse-quantization coefficient by performing inverse quantization on the quantization coefficient; generating a secondary inverse-transformation coefficient by performing secondary inverse-transformation on a low frequency component of the inverse-quantization coefficient, the secondary inverse-transformation corresponding to the secondary transformation; and performing core inverse-transformation on the secondary inverse-transformation coefficient, the core inverse-transformation corresponding to the core transformation.

The image decoding method may further include obtaining, from the bitstream, information about whether to perform the secondary inverse-transformation, and wherein the secondary inverse-transformation may be performed based on the information about whether to perform the secondary inverse-transformation.

The secondary inverse-transformation may be performed on a sub-group unit in a transformation block, and a size of the sub-group unit may be determined based on a size of the transformation block or a quantization parameter.

A type of the secondary inverse-transformation to be performed on the sub-group unit may be determined based on a location of the sub-group unit.

In accordance with another aspect of the present disclosure, an entropy decoding method includes obtaining, from a received bitstream, probability information used in performing arithmetic decoding on a current bin by updating, by using a first probability model and a second probability model, previous probability information that was used in performing arithmetic decoding on a previous bin; obtaining the current bin by performing arithmetic decoding based on the obtained probability information; and obtaining a syntax element by de-binarizing the obtained current bin, wherein the first probability model and the second probability model each use a size of a window indicating a number of bins decoded prior to the current bin, and a size of a window of the first probability model is less than a size of a window of the second probability model.

The size of the window of the first probability model and the size of the window of the second probability model may be obtained from the bitstream.

One of the size of the window of the first probability model and the size of the window of the second probability model may have a fixed value.

In accordance with another aspect of the present disclosure, an image decoding method includes extracting, from a received bitstream, prediction mode information of a current block to be decoded; generating a first prediction block with respect to the current block based on the extracted prediction mode information; extracting, from the bitstream, calculation information about a calculation in which each pixel constituting the first prediction block and adjacent pixels of the each pixel are used; generating a second prediction block by changing a pixel value of the each pixel via a calculation with respect to the each pixel constituting the first prediction block and pixels positioned at upper and left portions of the each pixel, based on the extracted calculation information; extracting, from the bitstream, and reconstructing a residual corresponding to a difference value between the current block and the second prediction block; and decoding the current block by adding the residual and the second prediction block, wherein the calculation information includes parameter index information, and the parameter index information includes a first weight parameter applied to the each pixel constituting the first prediction block, a second weight parameter applied to a pixel positioned at the upper portion of the each pixel, and a third weight parameter applied to a pixel positioned at the left portion of the each pixel.

The parameter index information may be defined with respect to each of coding units respectively having 2N×2N and N×N sizes.

The parameter index information may be included in the prediction mode information.

The parameter index information may be obtained from the bitstream at a level of a coding unit or a prediction unit.

In accordance with another aspect of the present disclosure, an image decoding method includes receiving a bitstream, determining whether to perform pixel unit motion compensation on a current block, based on information about whether the pixel unit motion compensation is limited, the information being extracted from the bitstream, when the pixel unit motion compensation is performed, extracting, from the bitstream, information about a first motion vector and a second motion vector respectively indicating a first corresponding region and a second corresponding region which are most similar to the current block in a first reference picture and a second reference picture; performing block unit bi-directional motion compensation on the current block by using the first motion vector and the second motion vector; performing the pixel unit motion compensation on each pixel of the current block by using pixels of the first reference picture and the second reference picture; and generating a bi-directional motion prediction value of the current block by using a result of the block unit bi-directional motion compensation and a result of the pixel unit motion compensation.

The information about whether the pixel unit motion compensation is limited may include at least one of a coded block flag (CBF), information indicating whether to perform motion compensation by using derived motion information, information indicating whether to perform local illumination compensation, and information indicating whether to perform affine motion compensation, and when the CBF is not 0, the motion compensation is performed by using the derived motion information, the local illumination compensation is performed, or the affine motion compensation is performed, the pixel unit motion compensation may not be performed.

The performing of the pixel unit motion compensation may include generating a pixel unit motion compensation value of the each pixel of the current block by using horizontal and vertical direction gradients of a first corresponding pixel of the first reference picture corresponding to the each pixel of the current block, horizontal and vertical direction gradients of a second corresponding pixel of the second reference picture corresponding to the each pixel of the current block, and a horizontal direction displacement vector and a vertical direction displacement vector determined by using the pixels of the first reference picture and the second reference picture.

The horizontal direction displacement vector and the vertical direction displacement vector may be determined to be horizontal and vertical direction displacement vectors by which a difference value between a first displacement value and a second displacement value becomes a minimum value, wherein the first displacement value is obtained by displacing the first corresponding pixel of the first reference picture in a window region having a predetermined size by using the horizontal and vertical direction displacement vectors and the horizontal and vertical direction gradients of the first corresponding pixel, and the second displacement value is obtained by displacing the second corresponding pixel of the second reference picture by using the horizontal and vertical direction displacement vectors and the horizontal and vertical direction gradients of the second corresponding pixel.

Advantageous Effects

An image encoding method and apparatus, and an image decoding method and apparatus corresponding to the image encoding method and apparatus may provide an effect by which prediction, motion compensation, transformation, and entropy coding are further efficiently performed.

DESCRIPTION OF THE DRAWINGS

FIG. 26 is a table showing filter coefficients of a gradient calculating filter, according to another embodiment.

MODE OF THE INVENTION

Figure 1:
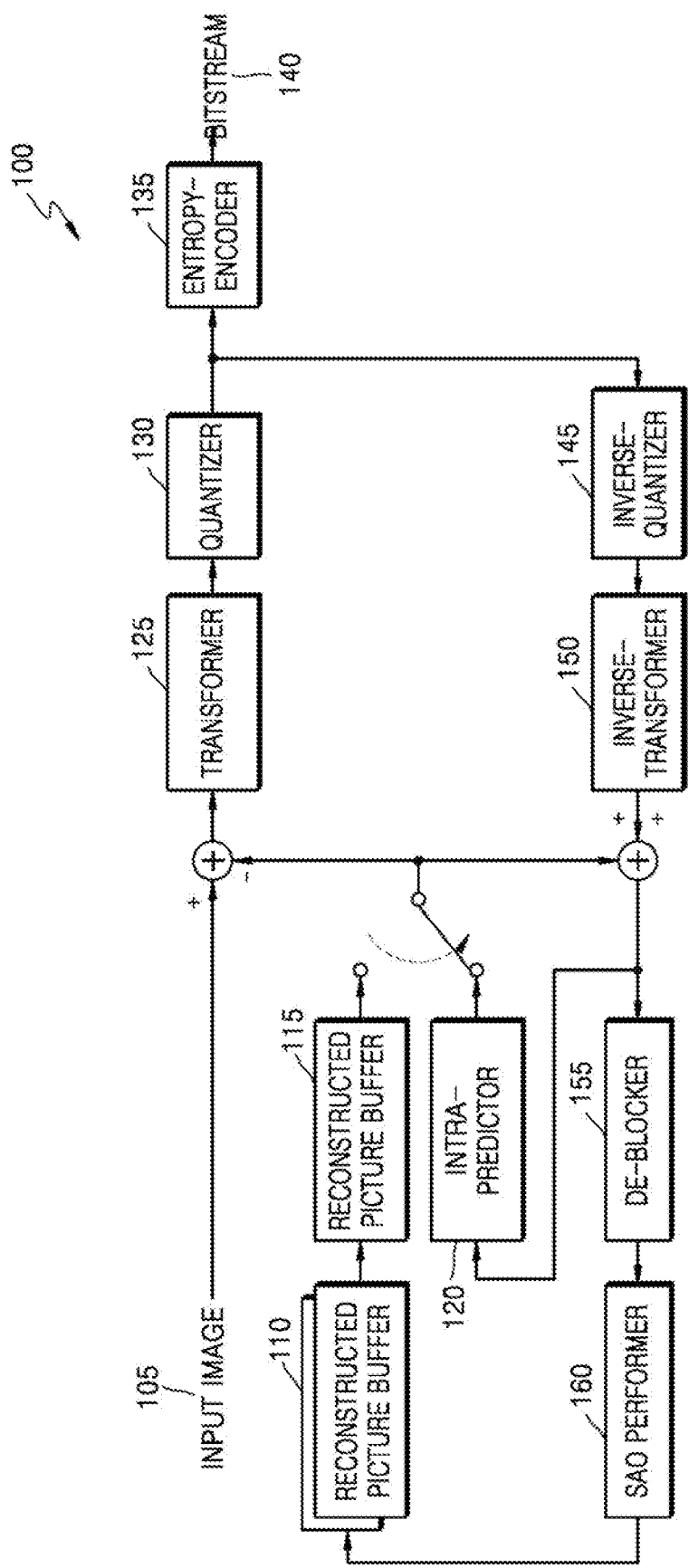
FIG. 1 is a block diagram illustrating a configuration of an image encoding apparatus, according to an embodiment.

Advantages and features of the present disclosure and methods of accomplishing the same may be understood more readily by reference to the following detailed description of embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to one of ordinary skill in the art.

Hereinafter, terms that are used in the specification will be briefly described, and the present disclosure will be described in detail.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Throughout the specification, a singular form may include plural forms, unless there is a particular description contrary thereto.

Throughout the specification, when a part "includes" or "comprises" an element, unless there is a particular description contrary thereto, the part can further include other elements, not excluding the other elements. Also, the term 'unit', as used herein, means, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

Hereinafter, an 'image' may indicate a static image such as a still image of a video or may indicate a dynamic image such as a moving picture that is the video itself.

The present disclosure will now be described more fully with reference to the accompanying drawings for one of ordinary skill in the art to be able to perform the present disclosure without any difficulty. In the drawings, for a more clear description of the present disclosure, parts or units that are not related to the descriptions are omitted.

Hereinafter, with reference to FIGS. 1 through 28, an image encoding apparatus, an image decoding apparatus, an image encoding method, and an image decoding method according to embodiments will now be described.

In more detail, with reference to FIGS. 1 and 2, rough configurations of an image encoding apparatus and an image decoding apparatus according to embodiments will be described below. Also, with reference to FIGS. 3 through 6, image encoding and decoding methods involving using core transformation and secondary inverse-transformation will be described below. Also, with reference to FIGS. 7 through 11, entropy encoding and decoding methods involving using a first probability model and a second probability model will be described below. Also, with reference to FIGS. 12 through 19, a method of post-processing a prediction block according to an embodiment will be described below. Also, with reference to FIGS. 20 through 28, a method of performing motion compensation by a block unit and a pixel unit will be described below.

Hereinafter, example embodiments of the present disclosure will now be described with reference to the accompanying drawings.

FIG. 1 is a block diagram illustrating a configuration of an image encoding apparatus, according to an embodiment.

An image encoding apparatus 100 according to an embodiment may include a transformer 125, a quantizer 130, an entropy-encoder 135, an inverse-quantizer 145, an inverse-transformer 150, a de-blocker 155, a sample adaptive offset (SAO) performer 160, an intra-predictor 120, a reconstructed picture buffer 110, and an inter-predictor 115.

The image encoding apparatus 100 according to an embodiment performs processes of encoding image data. That is, the intra-predictor 120 performs intra prediction on coding units in an intra mode, from among a current image 105, per prediction unit, and the inter-predictor 115 performs inter prediction on coding units in an inter mode by using the current image 105 and a reference image obtained from the reconstructed picture buffer 110 according to prediction units. The current image 105 may be split into largest coding units and then the largest coding units may be sequentially encoded. In this regard, the largest coding unit that is to be split into coding units having a tree structure may be encoded.

Residual data is generated by removing prediction data regarding coding units of each mode that is output from the intra-predictor 120 or the inter-predictor 115 from data regarding encoded coding units of the current image 105, and the residual data is output as a quantized transformation coefficient according to transformation units via the transformer 125 and the quantizer 130. The quantized transformation coefficient is reconstructed as the residual data in a spatial domain through the inverse-quantizer 145 and the inverse-transformer 150. The reconstructed residual data in the spatial domain is added to prediction data for coding units of each mode that is output from the intra-predictor 120 or the inter-predictor 115 and thus is reconstructed as data in a spatial domain for coding units of the current image 105. The reconstructed data in the spatial domain is generated as a reconstructed image through the de-blocker 155 and the SAO performer 160. The generated reconstructed image is stored in the reconstructed picture buffer 110. The reconstructed images stored in the reconstructed picture buffer 110 may be used as reference images for inter prediction with respect to another image. The transformation coefficient quantized by the transformer 125 and the quantizer 130 may be output as a bitstream 140 via the entropy-encoder 135.

The inter-predictor 115, the intra-predictor 120, the transformer 125, the quantizer 130, the entropy-encoder 135, the inverse-quantizer 145, the inverse-transformer 150, the de-blocker 155, and the SAO performer 160 which are elements of the image encoding apparatus 100 according to an embodiment may perform an operation based on each coding unit from among coding units according to a tree structure according to each largest coding unit.

In particular, the intra-predictor 120 and the inter-predictor 115 may determine a partition mode and a prediction mode of each coding unit from among the coding units according to a tree structure by taking into account a maximum size and a maximum depth of a current largest coding unit, and the transformer 125 may determine whether to split a transformation unit having a quadtree structure in each coding unit from among the coding units having a tree structure.

Figure 2:
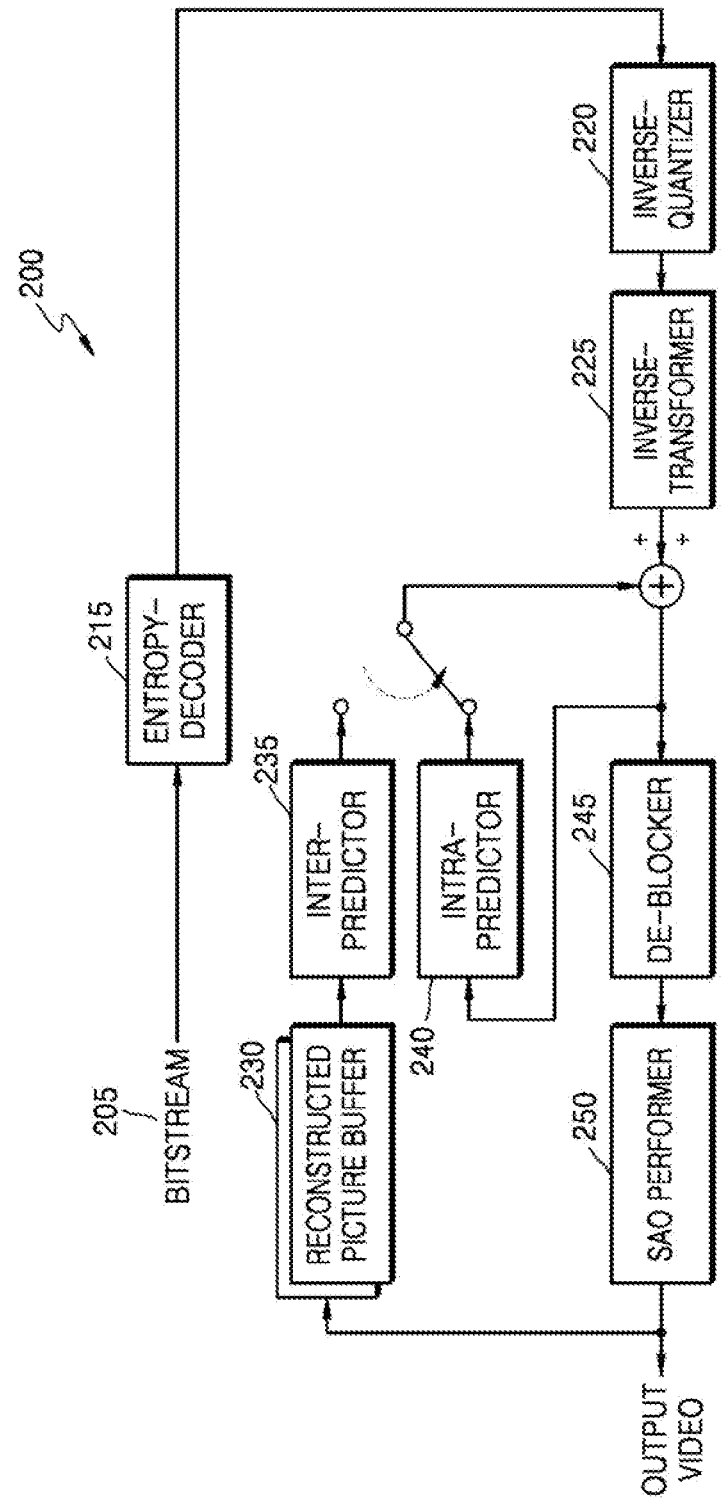
FIG. 2 is a block diagram illustrating a configuration of an image decoding apparatus, according to an embodiment.

FIG. 2 is a block diagram illustrating a configuration of an image decoding apparatus, according to an embodiment.

An image decoding apparatus 200 according to an embodiment may include an entropy-decoder 215, an inverse-quantizer 220, an inverse-transformer 225, a de-blocker 245, an SAO performer 250, an intra-predictor 240, a reconstructed picture buffer 230, and an inter-predictor 235.

The entropy-decoder 215 obtains, from a bitstream 205, decoding-target encoded image data and encoding information required for decoding. The encoded image data is a quantized transformation coefficient, and the inverse-quantizer 220 and the inverse-transformer 225 reconstruct residual data from the quantized transformation coefficient.

The intra-predictor 240 performs intra prediction on a coding unit in an intra mode. The inter-predictor 235 performs inter prediction by using a reference image with respect to the coding unit in an inter mode from among a current image, wherein the reference image is obtained from the reconstructed picture buffer 230.

Prediction data and residual data regarding coding units of each mode, which passed through the intra-predictor 240 or the inter-predictor 235, are summed, so that data in a spatial domain regarding coding units of the current image 205 may be reconstructed, and the reconstructed data in the spatial domain may be output as a reconstructed image 260 through the de-blocker 245 and the SAO performer 250. Also, reconstructed images that are stored in the reconstructed picture buffer 230 may be output as reference images.

The entropy-decoder 215, the inverse-quantizer 220, the inverse-transformer 225, the intra-predictor 240, the inter-predictor 235, the de-blocker 245, and the SAO performer 250 which are elements of the image decoding apparatus 200 according to an embodiment may perform an operation based on each coding unit from among coding units according to a tree structure according to each largest coding unit.

In particular, the intra-predictor 240 and the inter-predictor 235 may determine a partition mode and a prediction mode of each coding unit from among the coding units according to a tree structure, and the inverse-transformer 225 may determine whether or not to split a transformation unit according to a quadtree structure in each coding unit.

Figure 3:
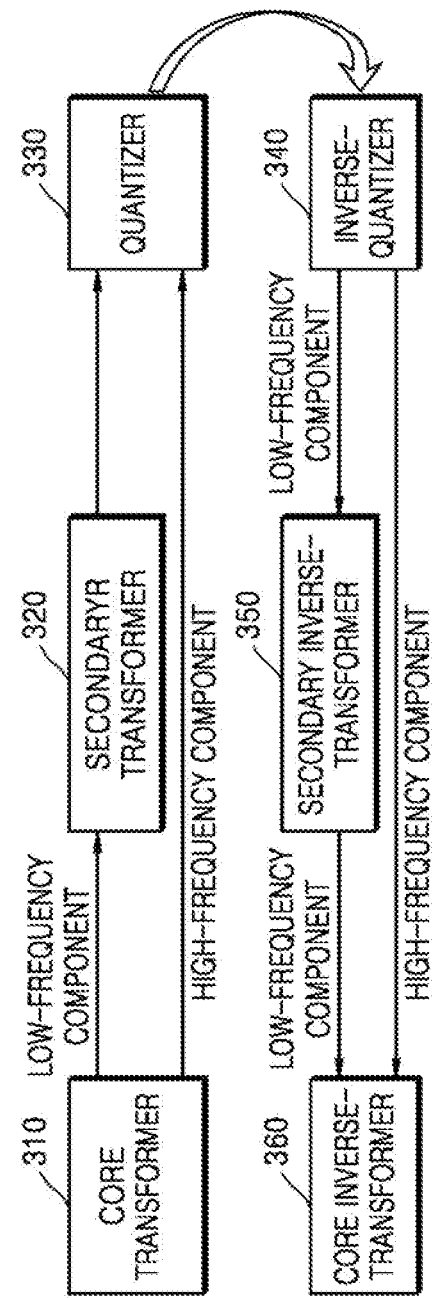
FIG. 3 is a block diagram illustrating configurations of image encoding and decoding apparatuses that perform core transformation and secondary inverse-transformation, according to an embodiment.

Hereinafter, with reference to FIGS. 3 through 6, image encoding and decoding methods involving using secondary transformation/inverse transformation will be described FIG. 3 is a block diagram illustrating configurations of image encoding and decoding apparatuses that perform secondary transformation/inverse transformation, according to an embodiment.

Referring to FIG. 3, the image encoding apparatus includes a core transformer 310, a secondary transformer 320, and a quantizer 330, and the image decoding apparatus includes an inverse-quantizer 340, a secondary inverse-transformer 350, and a core inverse-transformer 360. The core transformer 310 and the secondary transformer 320 of FIG. 3 may be included in the transformer 125 of FIG. 1, and the quantizer 330 may correspond to the quantizer 130 of FIG. 1. The inverse-quantizer 340 of FIG. 3 corresponds to the inverse-quantizer 220 of FIG. 2, and the secondary inverse-transformer 350 and the core inverse-transformer 360 may be included in the inverse-transformer 225 of FIG. 2.

In order to efficiently compress an image, the image encoding apparatus splits each of frames into blocks, and the core transformer 310 performs core transformation on each of blocks of a frame. The core transformer 310 may generate core transformation coefficients by performing transformation on a residual block according to each of transformation units. In this regard, a transformation unit may have a tree structure within a range of a maximum size and a minimum size, and whether a current block is split into sub-blocks may be indicated by a flag according to each of the transformation units. The core transformer 310 may perform transformation based on discrete cosine transform (DCT) and/or discrete sine transform (DST). The core transformation according to an embodiment is applied to all coefficients in a block. In the processing process, energy in each block may be compressed into a small number of large transformation coefficients and several small transformation coefficients.

The core transformation coefficients generated through the core transformation by the core transformer 310 may be divided into a low-frequency component domain having a small number of large transformation coefficients and a high-frequency component domain having several small transformation coefficients. The secondary transformer 320 according to an embodiment may perform secondary transformation on the low-frequency component domain, thereby increasing quantization performance.

The secondary transformation according to an embodiment may be performed based on DCT and/or DST as in the core transformation, and may be a random type such as orthogonal transformation, rotational transformation, or the like. However, unlike the core transformation performed on all of coefficients in a block, the secondary transformation is performed on the low-frequency component domain. Thus, the secondary transformation is not performed on a coefficient of the high-frequency component domain, the coefficient being from among the core transformation coefficients generated by the core transformer 310.

The secondary transformer 320 according to an embodiment may perform the secondary transformation on a sub-group unit smaller than a size of a transformation unit. For example, the secondary transformer 320 may perform the secondary transformation on transformation coefficients of a low-frequency component which are included in a 8×8-size sub group at the top left which is a portion of a transformation unit.

The quantizer 330 according to an embodiment may quantize coefficients that have been transformed by the core transformer 310 and the secondary transformer 320. The quantization coefficients are provided to the inverse-quantizer 340, and the inverse-quantizer 340 according to an embodiment performs inverse quantization on the quantization coefficients, thereby generating inverse-quantization coefficients. The inverse-quantizer 340 according to an embodiment may perform inverse-quantization on a Q_subgroups unit smaller than a size of a transformation unit.

The secondary inverse-transformer 350 according to an embodiment generates a secondary inverse-transformation coefficient by performing secondary inverse-transformation on a low frequency component of the inverse-quantization coefficient, wherein the secondary inverse-transformation corresponds to the secondary transformation. The core inverse-transformer 360 according to an embodiment performs core inverse-transformation on the secondary inverse-transformation coefficient, wherein the core inverse-transformation corresponds to the core transformation.

The secondary inverse-transformer 350 according to an embodiment may perform the secondary inverse-transformation based on inverse DCT and/or inverse DST. Because the secondary inverse-transformation is performed on the low frequency component of the inverse-quantization coefficient, the secondary inverse-transformation is not performed on a high frequency component of the inverse-quantization coefficient.

The secondary inverse-transformer 350 according to an embodiment may perform the secondary inverse-transformation on a 2nd_tr_sub-group unit smaller than a size of a transformation unit. For example, the secondary inverse-transformer 350 may perform the secondary inverse-transformation on inverse-quantization coefficients of a low frequency component which are included in a 8×8-size sub group at the top left which is a portion of a transformation unit.

The core inverse-transformer 360 according to an embodiment performs inverse transformation based on inverse DCT and/or inverse DST in a same manner by the secondary inverse-transformer 350, but the core inverse-transformer 360 performs the inverse transformation on all coefficients in the transformation unit, unlike the secondary inverse-transformation.

Figure 4:
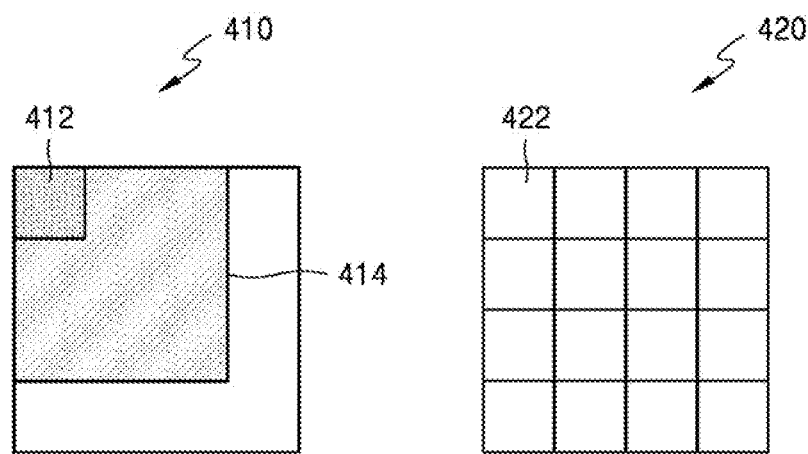
FIG. 4 is a diagram of a sub-group that is a unit on which secondary inverse-transformation is performed, according to an embodiment.

FIG. 4 is a diagram of a sub-group that is a unit on which secondary inverse-transformation is performed, according to an embodiment.

Referring to FIG. 4, the secondary inverse-transformation may be performed on sub-group units 412 and 422 positioned at the top left in respective transformation units 410 and 420. Because the secondary inverse-transformation is performed on the sub-group unit 412 or 422, high parallelism of a decoding operation may be maintained. However, in order to maintain the parallelism, a condition may be applied to a size of a sub-group unit on which the secondary inverse-transformation is performed. According to an embodiment, a condition indicating that the sub-group unit 412 on which the secondary inverse-transformation is performed has to be smaller than a group unit (i.e., coeff_coding_sub_group; 414) with which a quantization coefficient is obtained from a bitstream or a group unit (i.e., Q_sub-group; 414) on which inverse quantization is performed may be applied. However, according to an embodiment, a size of the sub-group unit 422 on which the secondary inverse-transformation is performed may be equal to that of the group unit (i.e., coeff_coding_sub_group) with which a quantization coefficient is obtained from a bitstream or the group unit (i.e., Q_sub-group) on which inverse quantization is performed.

Figure 5:
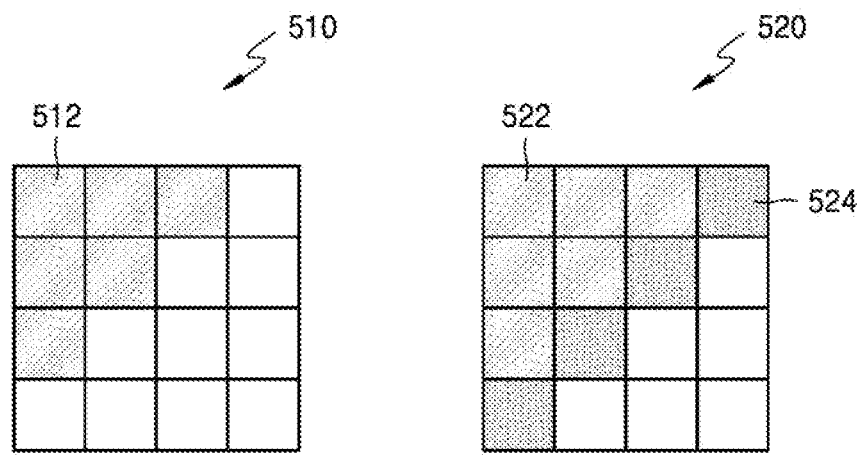
FIG. 5 is a diagram illustrating a range in which secondary inverse-transformation is performed, according to an embodiment.

FIG. 5 is a diagram illustrating a range in which secondary inverse-transformation is performed, according to an embodiment.

Referring to FIG. 5, the secondary inverse-transformation according to an embodiment may be performed on sub-group units 512 positioned at the top left in a transformation unit 510. The sub-group units 512 may indicate a domain corresponding to a low frequency component of an inverse-quantization coefficient. The secondary inverse-transformation according to an embodiment may be performed on sub-group units 522 and 524 in a transformation unit 520, and types of the secondary inverse-transformation may be determined depending on positions of sub-groups, wherein the secondary inverse-transformation is performed on the sub-groups based on the types, respectively. For example, inverse DCT may be performed on the sub-group units 522, and inverse DST may be performed on the sub-group units 524. Sizes of sub-group units are not fixed. The sizes of the sub-group units may be different from each other in a transformation unit, and may be determined based on positions of the sub-group units in the transformation unit. Information about the positions, the sizes, or the like regarding the sub-group units to be secondary inverse-transformed may be signalled via bitstreams in the respective sub-group units.

According to an embodiment, when the image encoding apparatus 100 applies secondary transformation to all transformation units, it is not necessary to signal information indicating whether or not the secondary transformation is performed to the image decoding apparatus 200. However, the image encoding apparatus 100 may compare costs of bitstreams obtained by encoding transformation coefficients generated by applying the secondary transformation, and may adaptively apply the secondary transformation to make a minimum cost. Thus, when the secondary transformation is applied to some transformation units, it is necessary to signal the information indicating whether or not the secondary transformation is performed to the image decoding apparatus 200.

The information indicating whether or not the secondary transformation is performed may be included in other syntax elements. For example, the information indicating whether or not the secondary transformation is performed may be included in information about a prediction mode, a split depth, an intra prediction direction, a transformation skip mode, or the like. In addition, the information indicating whether or not the secondary transformation is performed may be explicitly signalled by a coding unit, a transformation unit, a prediction unit or each sub-group unit in the transformation unit. When all coefficients in the transformation unit are 0 or coefficients have values equal to or less than a predetermined threshold value, the secondary transformation may not be performed, and in this case, the signalling of the information indicating whether or not the secondary transformation is performed may be omitted.

The image decoding apparatus 200 according to an embodiment may obtain, from a bitstream, and use the information indicating whether or not the secondary transformation is performed. The information indicating whether or not the secondary transformation is performed may be included in the bitstream associated with various data units. For example, the image decoding apparatus 200 may use parameter index information included in a sequence parameter set, a picture parameter set, a video parameter set, a slice header, and a slice segment header. Furthermore, the image decoding apparatus 200 may obtain and use syntax corresponding to the information indicating whether or not the secondary transformation is performed, from a bitstream according to each largest coding unit, each reference coding unit, each prediction unit, each transformation unit, or each sub-group unit in a transformation unit.

Figure 6:
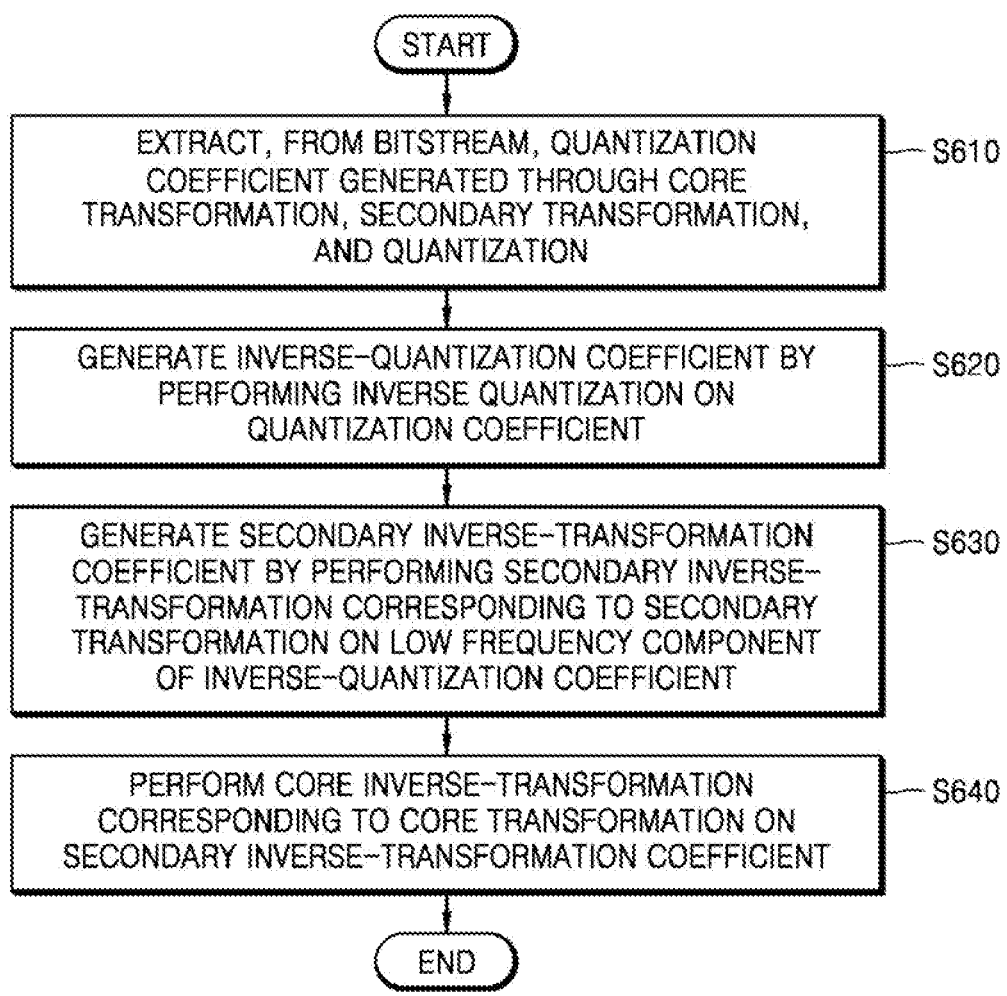
FIG. 6 is a flowchart of an image decoding method, according to an embodiment.

FIG. 6 is a flowchart of an image decoding method, according to an embodiment.

Referring to FIG. 6, in operation S610, the image decoding apparatus 200 may extract, from a bitstream, a quantization coefficient obtained by quantizing a transformation coefficient generated through core transformation and secondary transformation.

In operation S620, the image decoding apparatus 200 performs inverse quantization on the quantization coefficient, thereby generating an inverse-quantization coefficient.

In operation S630, the image decoding apparatus 200 generates a secondary inverse-transformation coefficient by performing secondary inverse-transformation on a low frequency component of the inverse-quantization coefficient, wherein the secondary inverse-transformation corresponds to the secondary transformation.

In operation S640, the image decoding apparatus 200 performs core inverse-transformation on the secondary inverse-transformation coefficient, the core inverse-transformation corresponding to the core transformation.

Hereinafter, with reference to FIGS. 7 through 11, entropy encoding and decoding methods involving using a first probability model and a second probability model according to embodiments will now be described.

As illustrated above with reference to FIGS. 1 and 2, the entropy-encoder 135 of the image encoding apparatus 100 according to an embodiment entropy encodes a plurality of pieces of encoding information, e.g., syntax elements such as a quantized transformation coefficient, a prediction mode of a prediction unit, a quantization parameter, a motion vector, etc., which are generated with respect to each coding unit. In more detail, the entropy-encoder 135 performs context-based adaptive binary arithmetic coding (hereinafter, referred to as "CABAC") on the syntax elements. Also, the entropy-decoder 215 of the image decoding apparatus 200 performs entropy decoding so as to obtain the syntax elements of a plurality of pieces of information to be decoded.

Figure 7:
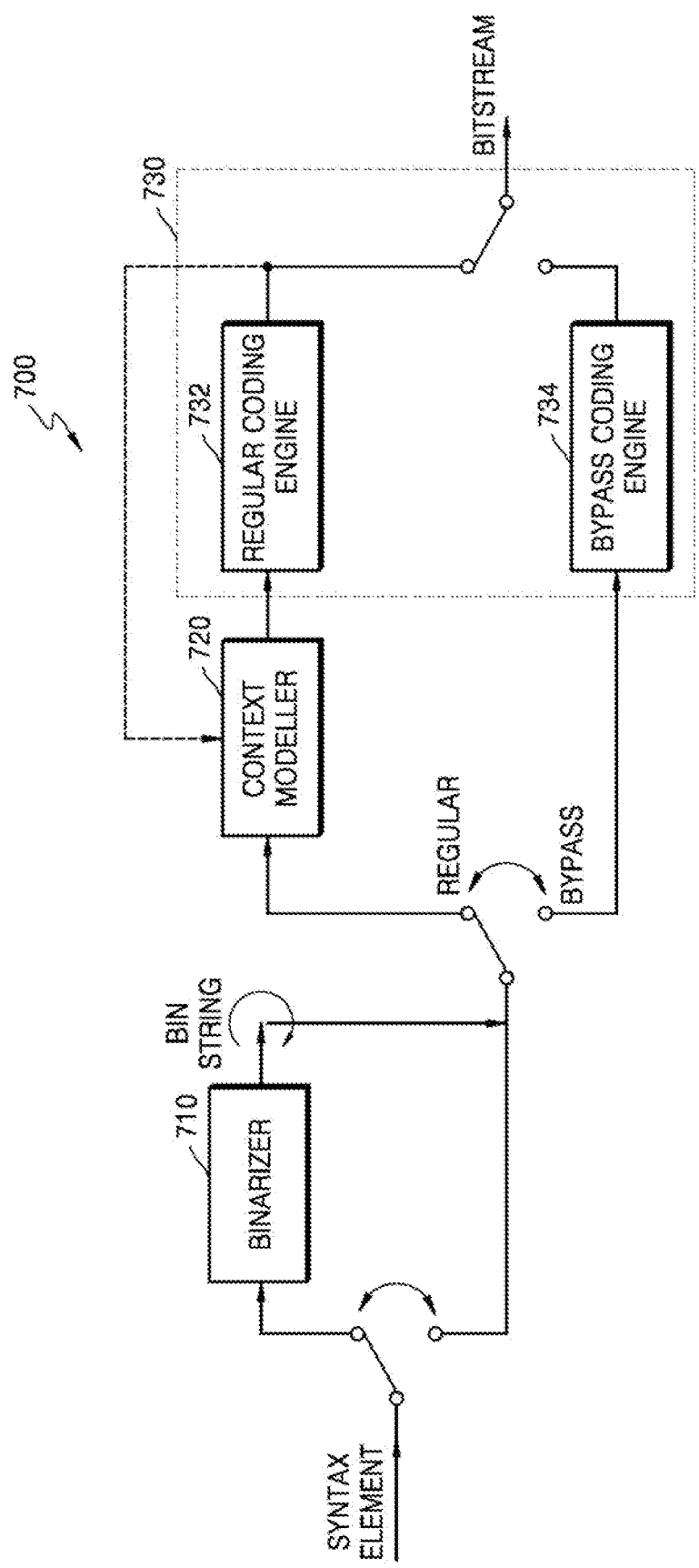
FIG. 7 is a block diagram illustrating a configuration of an entropy-encoder, according to an embodiment.

FIG. 7 is a block diagram illustrating a configuration of an entropy-encoder, according to an embodiment. An entropy-encoder 700 of FIG. 7 corresponds to the entropy-encoder 135 of FIG. 1.

Referring to FIG. 7, the entropy-encoder 700 according to an embodiment includes a binarizer 710, a context modeler 720, and a binary arithmetic coder 730. Also, the binary arithmetic coder 730 includes a regular coding engine 732 and a bypass coding engine 734.

Syntax elements input to the entropy-encoder 700 may not be binary values, thus, when the syntax elements are not binary values, the binarizer 710 binarizes the syntax elements and thus outputs a bin string consisting of binary values of 0 or 1. A bin indicates each bit of a stream consisting of 0 or 1, and is encoded based on CABAC. If a syntax element is data in which frequencies of 0 and 1 are equal, the syntax element is output to the bypass coding engine 734 that does not use a probability value and then is encoded.

The context modeler 720 provides a probability model with respect to a current encoding symbol to the regular coding engine 732. In more detail, the context modeler 720 determines a probability of a predetermined binary value, based on previously-encoded symbols, and outputs, to the binary arithmetic coder 730, an occurrence probability of a binary value for encoding a binary value of the current encoding symbol. An existing context modeler provides a probability model for an encoding symbol by providing an occurrence probability of a most probable symbol (MPS) and a context index (i.e., ctxIdx) indicating information which binary value from among 0 and 1 corresponds to the MPS. In contrast, the context modeler 720 according to an embodiment does not distinguish between an MPS and a least probable symbol (LPS), but determines P(1) indicating an occurrence probability of a predetermined binary value, e.g., "1", based on a previously-encoded symbol and provides the determined probability of the predetermined binary value to the binary arithmetic coder 730.

In addition, the context modeler 720 updates a probability of a predetermined binary value by using a plurality of probability models, based on a binary value of a current encoding symbol. A process of updating a probability of a predetermined binary value will be described in detail below.

The regular coding engine 732 performs CABAC based on the probability of the predetermined binary value and the binary value of the current encoding symbol which are provided from the context modeler 720. That is, the regular coding engine 732 may determine an occurrence probability P(1) of "1" and an occurrence probability P(0) of "0", based on the probability of the predetermined binary value provided from the context modeler 720, and may perform CABAC by changing a range indicating a probability range based on the binary value of the current encoding symbol based on the determined occurrence probabilities P(0) and P(1).

Figure 8:
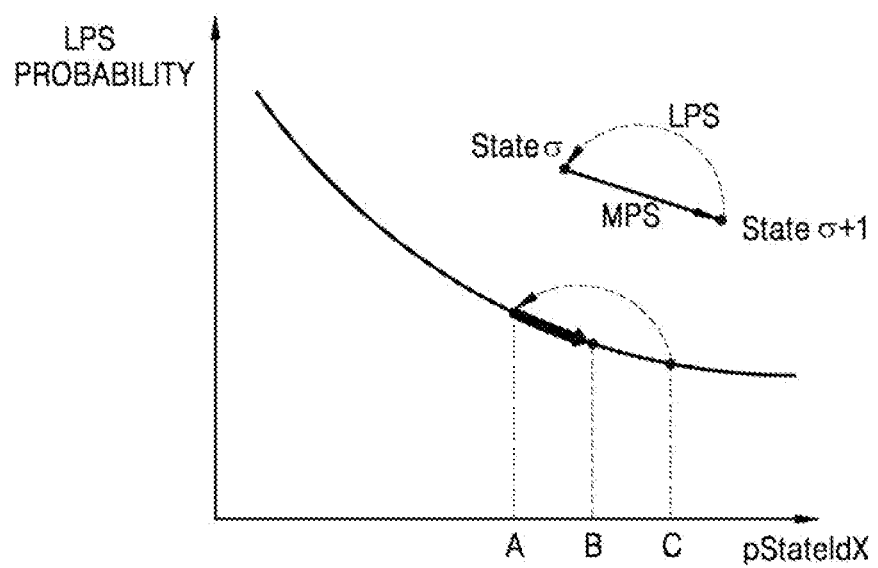
FIG. 8 is a diagram schematically illustrating an updating process of a probability model.

FIG. 8 is a diagram schematically illustrating an updating process of a probability model.

Referring to FIG. 8, when a probability state index pStateIdx in an existing probability function is determined, if a value of an encoding symbol is a value designated as an MPS, the probability state index pStateIdx is updated such that a probability state transitions from a current probability state (i.e., state σ) to a front-direction state (i.e., state σ+1) in which an LPS probability is decreased, and if the value of the encoding symbol is not the MPS, i.e., a value designated as an LPS, the probability state index pStateIdx is updated such that the probability state transitions from the current probability state (i.e., state σ) to a rear-direction state (i.e., state σ−k(k>0)) in which a probability of the LPS is increased. For example, when the current probability state index pStateIdx is C, if a value of a current encoding symbol is a value designated as the LPS, the current encoding symbol is encoded and then the probability state index pStateIdx is updated to A. If a value of a next encoding symbol is a value designated as the MPS, the probability state index pStateIdx is re-updated from A to B.

As illustrated, a probability function may have an exponential shape. In the probability function having the exponential shape, a probability distribution of an LPS being close to 0 is very thick, and a probability distribution of an LPS being close to ½ is very thin. Thus, in a case based on the probability function having the exponential shape, when occurrence probabilities of binary values of 0 and 1 are similar, i.e., when the occurrence probabilities of the binary values of 0 and 1 are close to ½, a distribution of a probability is thin, thus, a prediction error with respect to the probability may increase. Also, when the probability function having the exponential shape is used, a probability value that is close to 0 has to be finely expressed, thus, a bit depth expressing the probability value may be increased. Thus, a size of a look-up table for storing a probability model having the probability function with the exponential shape may be increased. In addition, according to the related art, when a probability is updated or a probability range is divided, if thick probability values are used, a computation of multiplication is increased such that a load may be applied to hardware.

Accordingly, the context modeler 720 according to an embodiment determines occurrence probabilities of binary values of 0 and 1, based on a probability function having a uniform distribution. In addition, the context modeler 720 according to an embodiment may update a probability of a predetermined binary value by using a plurality of probability models.

Hereinafter, a process of updating a probability model, the process being performed by the context modeler 720, will now be described in detail.

In CABAC, a probability update is performed by using Equation 1.

$$P\_new = \frac{y}{W} + \left(1 - \frac{1}{W}\right)P\_old \qquad \text{[Equation 1]}$$

In Equation 1, P_new indicates a probability of an updated LPS, P_old indicates a probability of an LPS used in performing arithmetic coding on a current encoding symbol, and W (where W is an integer) indicates the number of previously-encoded symbols and is referred to as a window size. 1/W is a scaling factor, and when the current encoding symbol has a binary value corresponding to a value of an MPS, y has a value of 0, and when the current encoding symbol has a binary value corresponding to a value of an LPS, y has a value of 1.

In an updating process with respect to a probability which is performed by using Equation 1, an important parameter is a scaling factor 1/W. Depending on a value of the scaling factor 1/W, sensitivity and stability of an entire CABAC encoding procedure which does not react to noise or an error are determined. A process of determining an appropriate value of the scaling factor 1/W is difficult and consuming process.

Thus, in order to update a probability, the context modeler 720 according to an embodiment generates a plurality of updated probabilities by using a first probability model and a second probability model having different scaling factors, and determines a finally-updated probability by using respective probabilities updated using the first probability model and the second probability model. In other words, the first probability model and the second probability model may have different window sizes.

In more detail, the first probability model and the second probability model which are used by the context modeler 720 according to an embodiment are based on Equation 2 and Equation 3.

$$P0\_new = \frac{y}{W0} + \left(1 - \frac{1}{W0}\right)P0\_old \qquad \text{[Equation 2]}$$

$$P1\_new = \frac{y}{W1} + \left(1 - \frac{1}{W1}\right)P1\_old \qquad \text{[Equation 3]}$$

In Equation 2, P0_new indicates a probability of a predetermined binary value updated based on the first probability model using a window size W0, and P0_old indicates a probability of a predetermined binary value used in performing arithmetic coding on a current encoding symbol. In Equation 3, P1_new indicates a probability of a predetermined binary value updated based on the second probability model using a window size W1, and P1_old indicates a probability of the predetermined binary value used in performing arithmetic coding on the current encoding symbol. According to an embodiment, a size of W0 of the first probability model and a size of W1 of the second probability model may be different from each other. For example, W0 may be less than W1. In Equation 2 and Equation 3, P0_new, P0_old, P1_new, or P1_old indicates an occurrence probability of the predetermined binary value that is 0 or 1. That is, a probability used in an embodiment indicates an occurrence probability of a particular binary value, e.g., "1", neither an MPS nor an LPS. In descriptions below, it is assumed that the predetermined binary value is 1, that is, P_new or P_old indicates an occurrence probability of "1". However, it is not limited thereto, thus, even when it is set that P_new or P_old indicates an occurrence probability of "0", the updating process with respect to a probability according to the embodiment may be similarly applied thereto.

When probabilities P0_new and P1_new are obtained based on Equation 2, the context modeler 720 calculates a finally-updated probability P_new by using Equation 4 below.

$$P_{new}=(P0_{new}+P1_{new}+1)>>1 \qquad \text{[Equation 4]}$$

In a CABAC encoding procedure, an entropy reset is performed according to each slice unit. The entropy reset means that CABAC is performed in a manner that a current probability value is discarded, and then CABAC encoding is newly performed based on a predetermined probability value. A probability value set as an initial value in a probability updating process performed after the reset process is not an optimal value, and after an updating process is performed several times, probability values are converged on a predetermined probability value.

Figure 9:
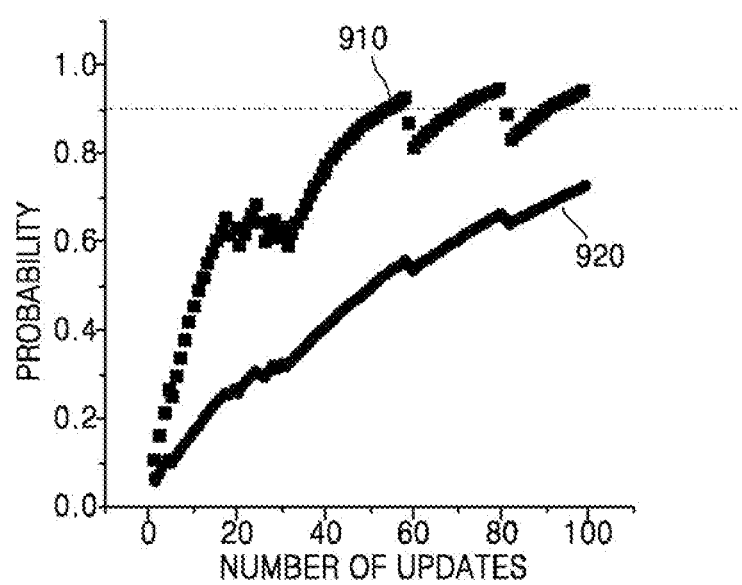
FIG. 9 is a diagram for comparison between updated probabilities with respect to a first probability model and a second probability model, according to an embodiment.

FIG. 9 is a diagram for comparison between updated probabilities with respect to a first probability model and a second probability model, according to an embodiment.

In a graph of FIG. 9, it is set that a window size W0 of a first probability model 910 is less than a window size W1 of a second probability model 920. For example, a window size of the first probability model 910 may be 16, and a window size of the second probability model 920 may be 256.

Referring to FIG. 9, when the first probability model 910 having a relatively small window size is used, the more the probability update is performed, the faster the probability is changed to be quickly converged on a certain range, but when the update is repeated, fluctuation easily occurs. On the other hand, when the second probability model 920 having a relatively large window size is used, a probability is not quickly changed but once updated probabilities are converged on a predetermined range, fluctuation rarely occurs, thus, sensitivity to an error or noise is very small and an operation is stable.

Thus, the context modeler 720 may adaptively adjust sizes of W0 and W1 by taking into account the probability updating processes of the first probability model and the second probability model. For example, the context modeler 720 may perform a probability updating process in a manner that the context modeler 720 sets a size of W1 as a large size (e.g., W1=∞) during a threshold number of times after the entropy reset is performed, and after the threshold number of times, the context modeler 720 may adjust the size of W1 for stability of a system.

Figure 10:
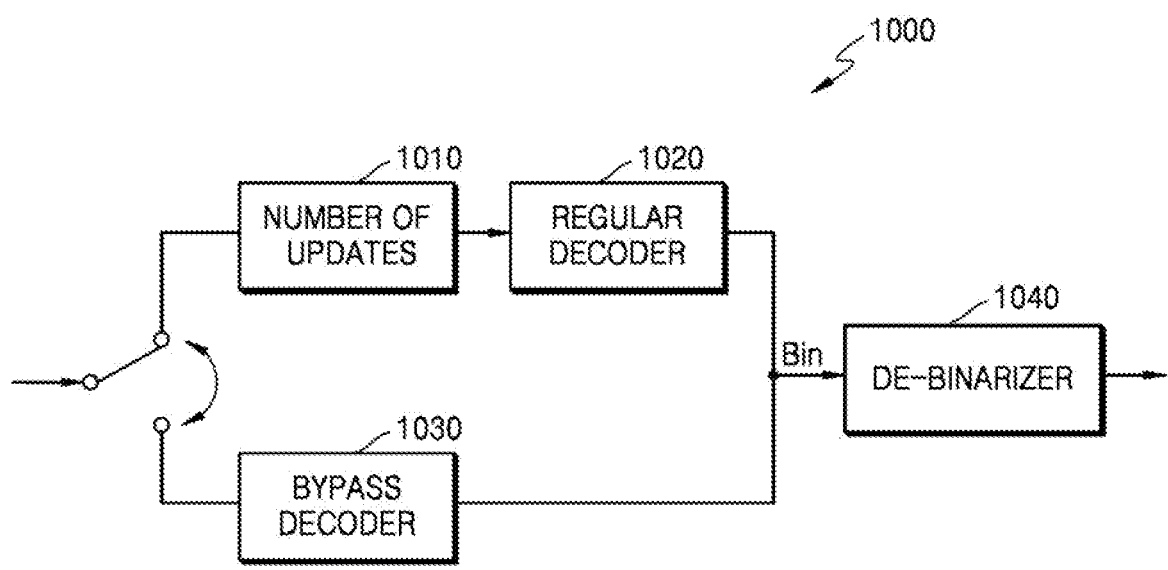
FIG. 10 is a block diagram illustrating a configuration of an entropy-decoder, according to an embodiment.

FIG. 10 is a block diagram illustrating a configuration of an entropy-decoder, according to an embodiment.

An entropy-decoder 1000 of FIG. 10 may correspond to the aforementioned entropy-decoder 215 of FIG. 2.

Referring to FIG. 10, the entropy-decoder 1000 includes a context modeler 1010, a regular decoder 1020, a bypass decoder 1030, and a de-binarizer 1040. The entropy-decoder 1000 performs an inverse process of an entropy encoding process performed by the entropy-encoder 700.

A symbol encoded due to bypass coding is output to and thus is decoded by the bypass decoder 1030, and a symbol encoded due to regular coding is decoded by the regular decoder 1020. The regular decoder 1020 performs arithmetic decoding on a binary value of a current encoding symbol by using a probability of a predetermined binary value determined based on previously-encoded symbols that were decoded prior to the current encoding symbol provided by the context modeler 1010. As described above, because a binary value indicating a representative value of a predetermined probability range is transmitted as an encoded symbol according to a binary arithmetic coding result, the regular decoder 1020 may decode encoded symbols by using occurrence probabilities of 0 and 1.

The context modeler 1010 updates the probability of the predetermined binary value by using a plurality of scaling factors, based on the binary value of the decoded encoding symbol. As described above, the context modeler 1010 does not distinguish between an MPS and an LPS, but determines P(1) indicating an occurrence probability of the predetermined binary value, e.g., "1", based on the previously-encoded symbols and provides the determined probability of the predetermined binary value to the regular decoder 1020. The de-binarizer 1040 reconstructs bin strings to syntax elements, the bin strings having been reconstructed by the regular decoder 1020 or the bypass decoder 1030.

As described above, the first probability model and the second probability model may be adaptively selected based on content. For example, the first probability model and the second probability model may be determined based on a slice or a picture. Also, the window size W0 of the first probability model and the window size W1 of the second probability model may be adaptively determined and may be signalled from the image encoding apparatus 100 to the image decoding apparatus 200 via a bitstream. In this regard, values of W0 and W1 may be signalled in a unit of group of pictures (GOP), a slice, a largest coding unit, or the like.

According to an embodiment, a value of one of W0 and W1 may be set as a fixed value, and only the other value may be signalled via a bitstream. In this regard, the fixed value of a window size may depend on a type of a picture or a slice.

According to an embodiment, W0 and W1 may all have fixed values, and in this case, a separate syntax element to indicate the values of W0 and W1 is not required to be signalled. On the other hand, when values of W0 and W1 vary, the values of W0 and W1 may be obtained from a bitstream or may be determined based on a slice type or a picture type.

Figure 11:
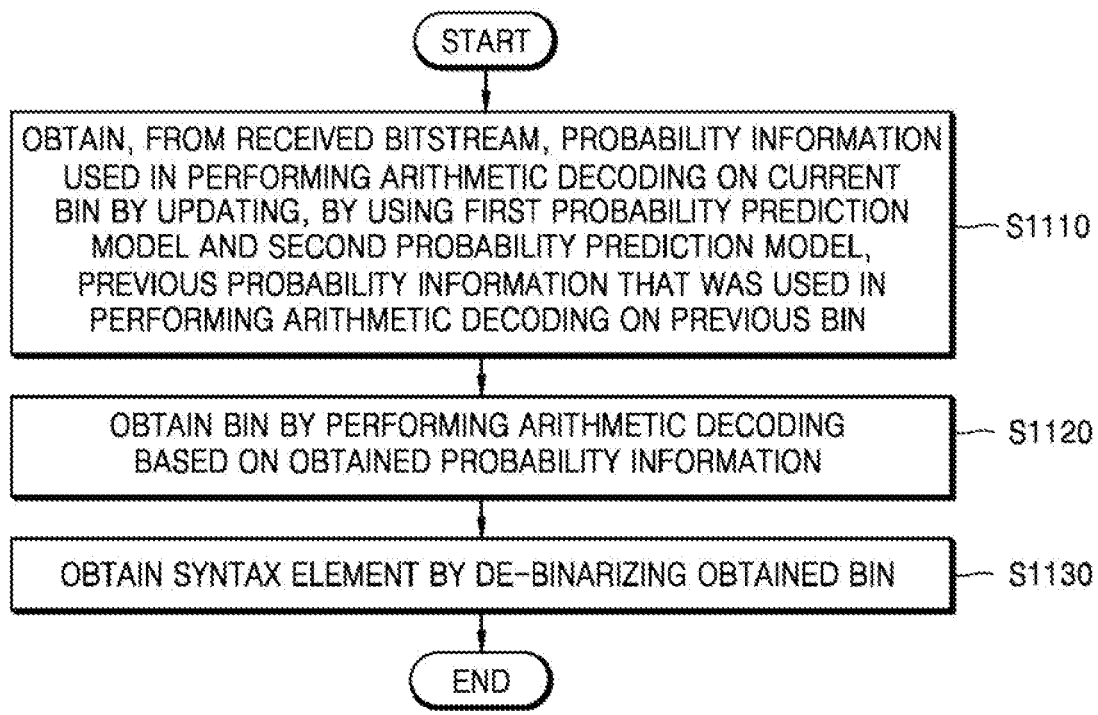
FIG. 11 is a flowchart of an entropy decoding method, according to an embodiment.

FIG. 11 is a flowchart of an entropy decoding method, according to an embodiment.

Referring to FIG. 11, in operation S1110, the entropy-decoder 1000 may obtain, from a received bitstream, probability information used in performing arithmetic decoding on a current bin by updating, by using a first probability prediction model and a second probability prediction model, previous probability information that was used in performing arithmetic decoding on a previous bin.

In operation S1120, the entropy-decoder 1000 obtains a bin by performing arithmetic decoding based on the obtained probability information.

In operation S1130, the entropy-decoder 1000 obtains a syntax element by de-binarizing the obtained bin.

Hereinafter, with reference to FIGS. 12 through 19, a method of post-processing a prediction block according to an embodiment will now be described.

Figure 12:
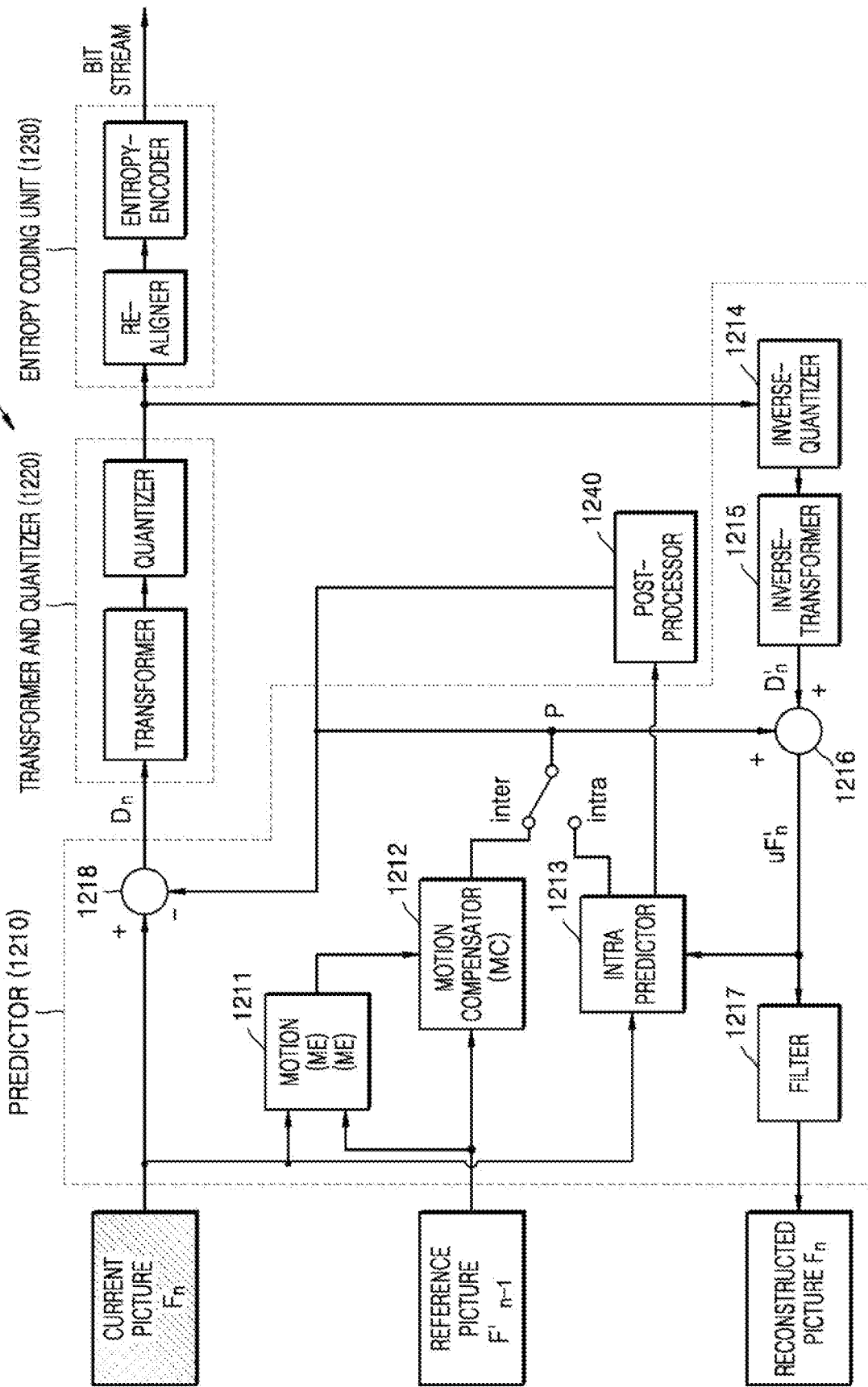
FIG. 12 is a block diagram illustrating a configuration of an image encoding apparatus including a post-processor, according to an embodiment.

FIG. 12 is a block diagram illustrating a configuration of an image encoding apparatus including a post-processor, according to an embodiment.

Referring to FIG. 12, an image encoding apparatus 1200 includes a predictor 1210, a transformer and quantizer 1220, an entropy coding unit 1230, and a post-processor 1240.

The predictor 1210 performs inter prediction and intra prediction. The inter prediction refers to prediction with respect to a current block by using a reference picture that is previously encoded, reconstructed and stored. The inter prediction is performed by a motion estimator 1211 and a motion compensator 1212. The intra prediction refers to prediction with respect to a current block by using a pixel of a block that is adjacent to a block to be predicted. The intra prediction is performed by an intra predictor 1213.

Figure 13:
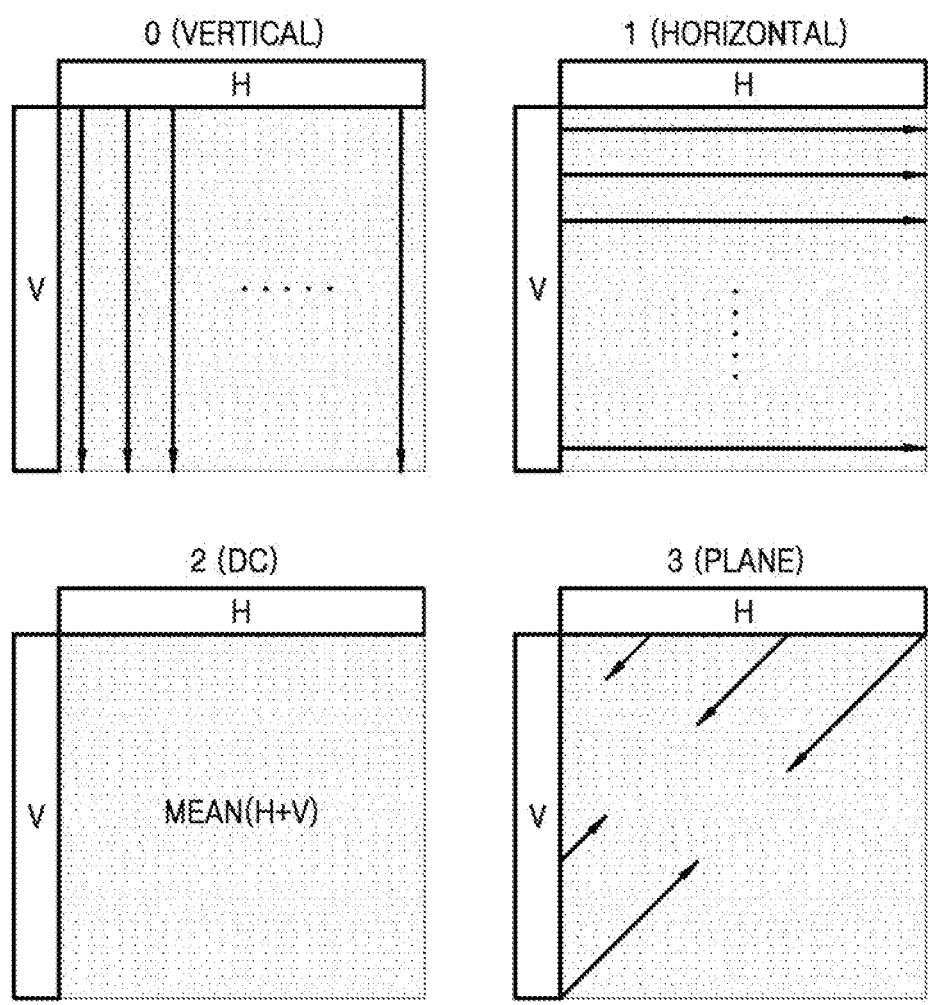
FIG. 13 illustrates an example of a 16×16 intra prediction mode.
Figure 14:
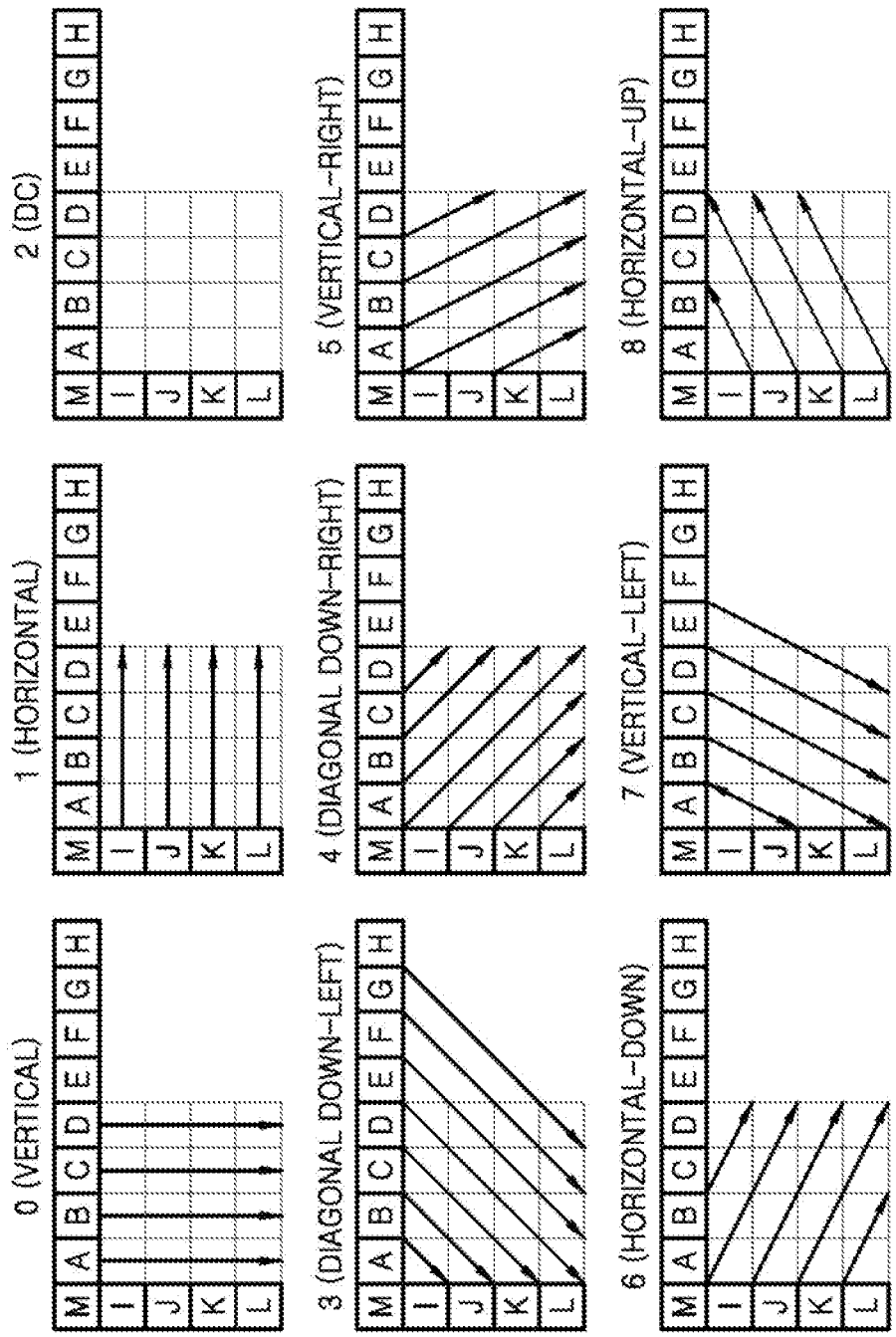
FIG. 14 illustrates an example of a 4×4 intra prediction mode.

FIG. 13 illustrates an example of a 16×16 intra prediction mode, and FIG. 14 illustrates an example of a 4×4 intra prediction mode.

Referring to FIG. 13, the 16×16 intra prediction mode includes four modes which are a vertical mode, a horizontal mode, a direct current (DC) mode, and a plane mode. In addition, referring to FIG. 14, the 4×4 intra prediction mode includes nine modes which are a vertical mode, a horizontal mode, a DC mode, a diagonal down-left mode, a diagonal down-right mode, a vertical right mode, a vertical left mode, a horizontal-up mode, and a horizontal-down mode.

For example, an operation of prediction encoding a current block having a size of 4×4 according to a mode 0 of FIG. 14, i.e., according to the vertical mode of FIG. 3 will be described. First, pixel values of pixels A to D that are adjacent to an upper portion of the current block having the size of 4×4 are predicted as pixel values of the 4×4 current block. In other words, the value of the pixel A is predicted as four pixel values included in a first column of the 4×4 current block, the value of the pixel B is predicted as four pixel values included in a second column of the 4×4 current block, the value of the pixel C is predicted as four pixel values included in a third column of the 4×4 current block, and the value of the pixel D is predicted as four pixel values included in a fourth column of the 4×4 current block. In this manner, the prediction block that is generated by the intra prediction by which a value of an adjacent pixel is extended in a predetermined direction has predetermined directivity according to a prediction mode. Prediction efficiency may be improved when pixels of a current block to be encoded have predetermined directivity, however, when pixels of the current block do not have directivity, prediction efficiency may deteriorate. Thus, as will be described below, the post-processor 1240 of the image encoding apparatus according to the present disclosure changes a pixel value of each pixel inside the prediction block by performing an operation using each pixel inside the prediction block and at least one adjacent pixel, which is a post-processing operation with respect to the prediction block generated through the intra prediction, and generates a new prediction block, thereby improving image prediction efficiency.

Referring back to FIG. 12, the transformer and quantizer 1220 transforms and quantizes residual, which is a difference value between a prediction block and an original image block respectively output from the predictor 1210 and the post-processor 1240, and the entropy coding unit 1230 performs compression by performing variable length encoding on the quantized residual information. The encoded residual is reconstructed by an inverse-quantizer 1214 and an inverse-transformer 1215, and an adder 1216 adds the reconstructed residual to the prediction block so as to reconstruct the current block. The reconstructed block is stored in a storage unit (not shown) and is used as reference data when a next block is encoded.

Hereinafter, an operation of post-processing a prediction block, the operation being performed by the post-processor 1240 of FIG. 12, will now be described.

The post-processor 1240 changes a pixel value of each of pixels constituting a first prediction block by performing a calculation using each pixel of a first prediction block generated by the intra predictor 1213 and at least one adjacent pixel, thereby generating a second prediction block. In this regard, the intra predictor 1213 generates the first prediction block by using a general intra prediction method.

Figure 15:
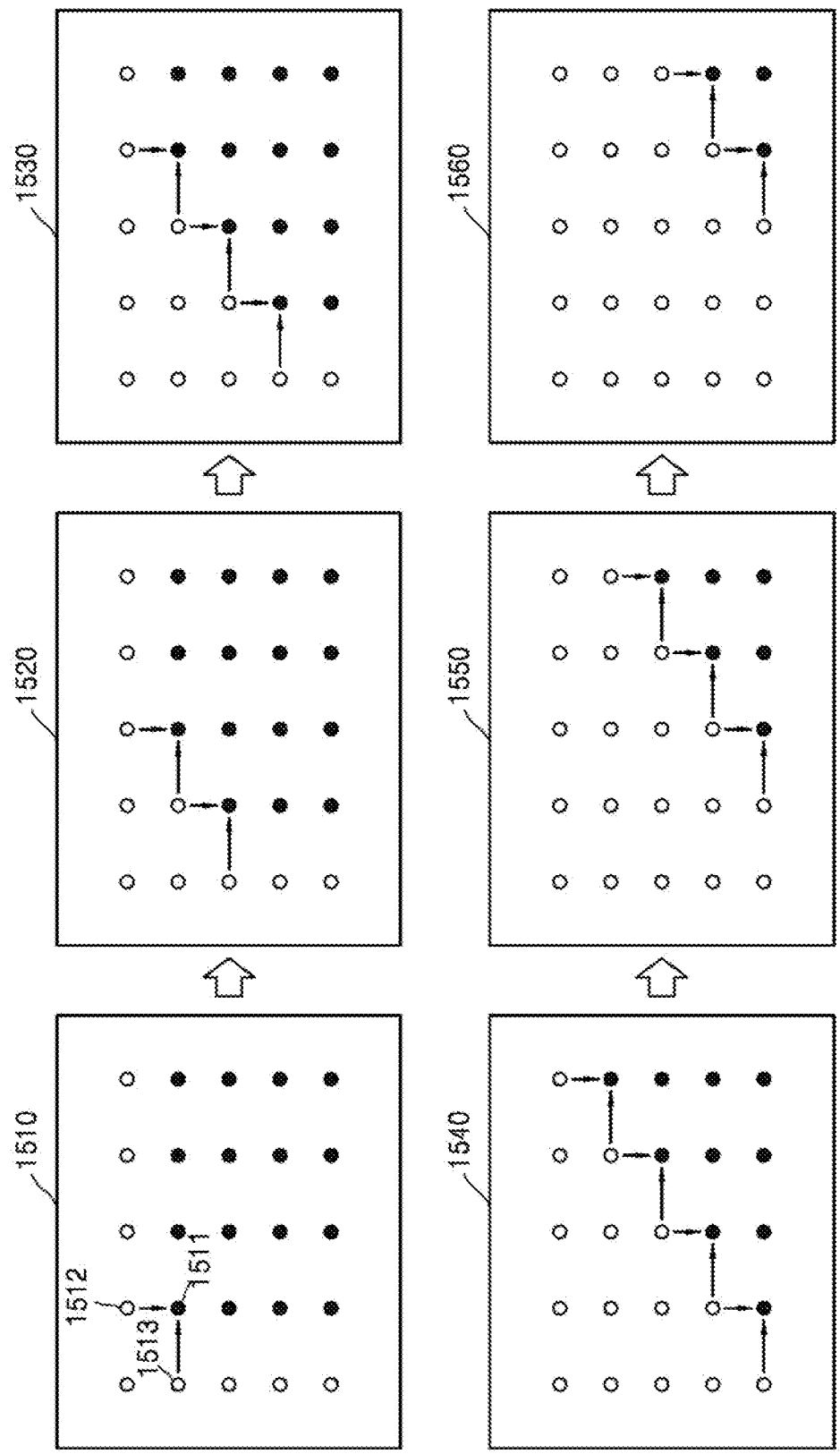
FIG. 15 is a reference diagram for describing an operation of post-processing a first prediction block, according to an embodiment.

FIG. 15 is a reference diagram for describing an operation of post-processing a first prediction block, according to an embodiment. In FIG. 15, reference numerals 1510 through 1560 represent a process of changing each pixel value inside the first prediction block processed by the post-processor 1240 in a time sequence.

Referring to FIG. 15, the post-processor 1240 according to an embodiment changes a pixel value of each pixel of the first prediction block by calculating an average value by applying a weight to each of pixel values of a pixel to be changed inside a first prediction block 1510 and adjacent pixels positioned at upper and left portions of the pixel. For example, in FIG. 15, when a pixel value of a pixel 1521 to be changed of the first prediction block 1510 is P[1][1], a pixel value of a pixel 1522 positioned at an upper portion is P[0][1], a pixel value of a pixel 1523 positioned at a left portion is P[1][0], and a value obtained by changing the pixel value P[1][1] of the pixel 1521 is P'[1][1], P'[1][1] may be calculated by using Equation 5 below.

$$P'[1][1] = \frac{\alpha P[1][1] + \beta P[0][1] + \gamma P[1][0] + 2}{4} \quad \text{[Equation 5]}$$

In Equation 5, α indicates a first weight parameter applied to P[1][1], β indicates a second weight parameter applied to P[0][1] that is a pixel value of a pixel positioned at an upper portion of P[1][1, and γ indicates a third weight parameter applied to P[1][0] that is a pixel value of a pixel positioned at a left portion of P[1][1].

As illustrated in FIG. 15, the post-processor 1240 according to an embodiment changes a pixel value of each pixel of the first prediction block by applying a weight to a pixel value of a pixel to be changed and each of pixel values of adjacent pixels positioned at upper and left portions of the pixel from the uppermost and left portions to the lowermost and right portions of each pixel inside the first prediction block. However, the operation of post-processing the first prediction block is not limited to the above described manner i.e. from the uppermost and left portions to the lowermost and right portions, and thus may be sequentially performed on each of pixels of the first prediction block from the uppermost and right portions to the lowermost and left portions, from the lowermost and right portions to the uppermost and left portions, or from the lowermost and left portions to the uppermost and right portions. For example, in an opposite order to the order of processing illustrated in FIG. 15, when pixels of the first prediction block are changed from the lowermost and right portions to the uppermost and left portions, a pixel value of each pixel of the first prediction block is changed via a calculation using a pixel to be changed and pixels positioned at lower and right portions of the pixel.

Figure 16:
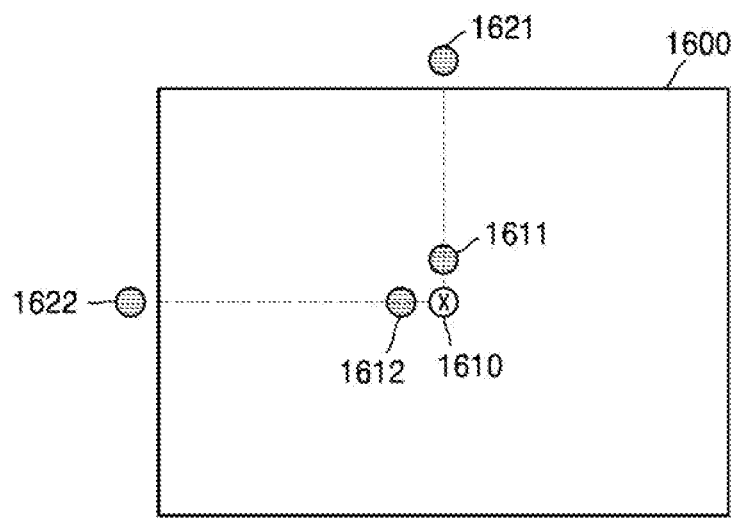
FIG. 16 is another reference diagram illustrating an operation of the post-processor, according to an embodiment.

FIG. 16 is another reference diagram illustrating an operation of the post-processor 1240, according to an embodiment. In FIG. 16, reference numeral 1610 indicates a first pixel of a first prediction block to be currently changed, and reference numeral 1611 indicates a second pixel positioned at an upper portion of a first pixel 1610, and reference numeral 1612 indicates a third pixel positioned at a left portion of the first pixel 1610.

The operation of the post-processor 1240 according to an embodiment is generalized below with reference to FIG. 16. When the size of the first prediction block is m×n (where m and n are positive integers), a pixel value of the first pixel 1610 which is to be changed and is positioned in an i-th (where i is an integer from 0 to m−1) column and a j-th (where j is an integer from 0 to n−1) row inside the first prediction block is P[i][j], a pixel value of the second pixel 1612 positioned at a left portion of the first pixel 1610 is P[i][j−1], and a pixel value of the third pixel 1611 positioned at an upper portion of the first pixel 1610 is P[i−1][j], the pixel value of the first pixel 1610 is changed into P'[i][j] by using Equation 6.

$$P'[i][j]=(\alpha P[i][j]+\beta P[i-1][j]+\gamma P[i][j-1]+2)>>2 \quad \text{[Equation 6]}$$

In Equation 6, α indicates a first weight parameter applied to P[i][j], β indicates a second weight parameter applied to P[i−1][j] that is a pixel value of a pixel positioned at an upper portion of P[i][j], and γ indicates a third weight parameter applied to P[i][j−1] that is a pixel value of a pixel positioned at a left portion of P[i][j]. According to an embodiment, when a position of a pixel to be changed becomes distant from a boundary of the first prediction block, a value of a weight parameter β or γ may be decreased. Relations among weight parameters α, β and γ may be determined base on a relation of Equation 7 below.

$$\alpha+\beta+\gamma=2^P \quad \text{[Equation 7]}$$

In Equation 7, P indicates an integer equal to or greater than 0.

The post-processor 1240 generates a second prediction block by changing a pixel value by applying Equation 2 to all pixels inside the first prediction block 1600 from the uppermost and left portions to the lowermost and right portions.

The image encoding apparatus 1200 according to an embodiment may compare costs of bitstreams obtained by encoding second prediction blocks generated by applying various weights, and may add weight information (i.e., the first through third weight parameters) which is used in generating a second prediction block having a lowest cost to a header region of the bitstreams. In this regard, information about the first through third weight parameters is described as parameter index information as in Table 1.

TABLE 1

| Parameter Index | 2N × 2N intra coding unit | | | N × N intra coding unit | | |
|---|---|---|---|---|---|---|
| | α | β | γ | α | β | γ |
| 0 | 8 | 0 | 0 | 8 | 0 | 0 |
| 1 | 4 | 2 | 2 | 6 | 1 | 1 |
| 2 | 4 | 4 | 0 | 6 | 2 | 0 |
| 3 | 4 | 0 | 4 | 6 | 0 | 2 |

In Table 1 above, parameter index information may be defined with respect to each of coding units respectively having 2N×2N and N×N sizes. The parameter index information according to an embodiment may be signalled from an image encoding apparatus to an image decoding apparatus in various manners. For example, the parameter index information may be included in information about a prediction mode. Also, the parameter index information may be included in information indicating a block size, information indicating a partition shape of a block, information indicating a luminance or chrominance component, or the like, and may be signalled. According to an embodiment, the parameter index information may be explicitly signalled at a level of a coding unit or a prediction unit.

When the image encoding apparatus 1200 according to an embodiment divides a coding unit into smaller blocks and performs prediction, the image encoding apparatus 1200 may generate a second prediction block by applying different weights to respective blocks, and in order to simplify a calculation and decrease an overhead rate, the image encoding apparatus 1200 may allow same weight information to be applied to blocks included in a same coding unit.

Figure 17:
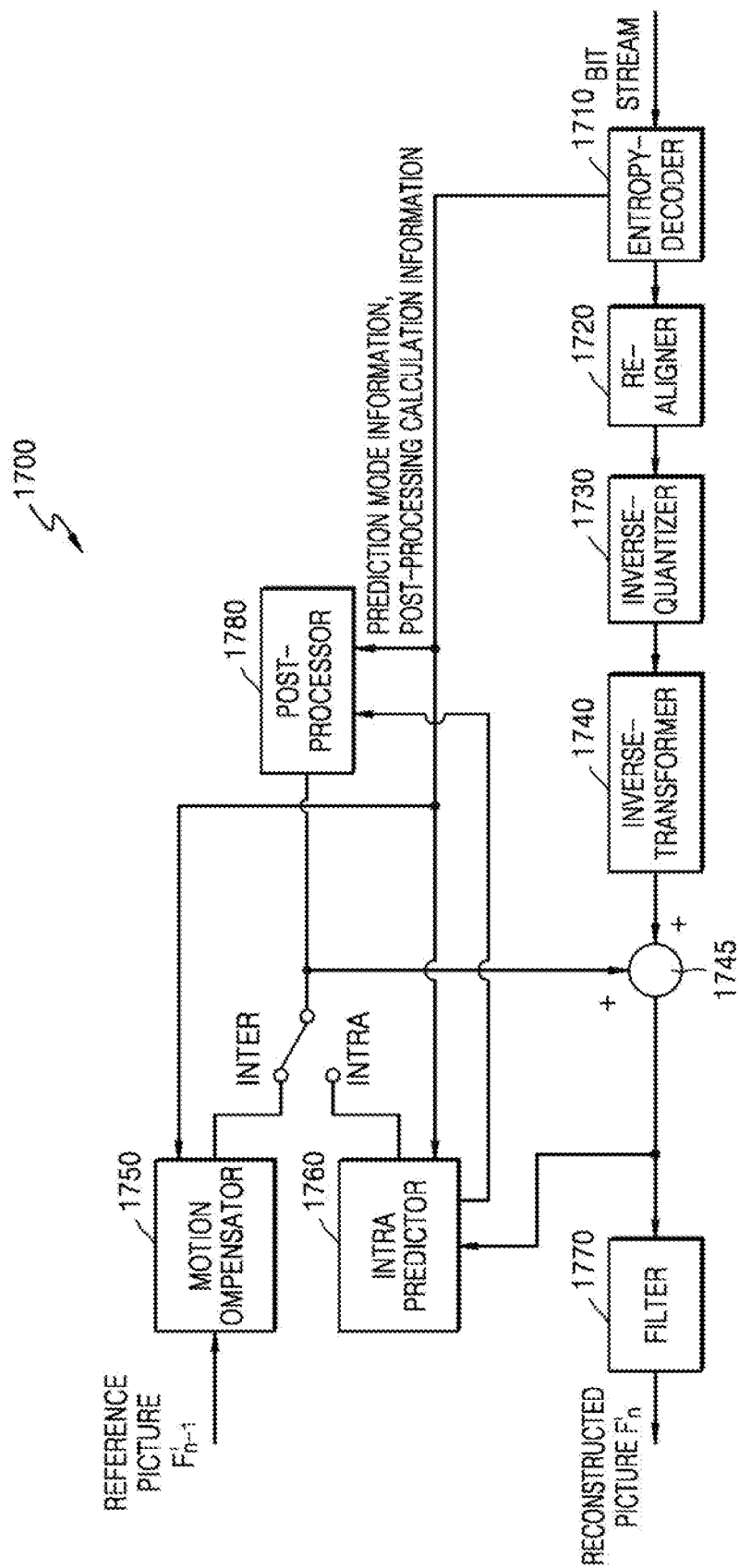
FIG. 17 is a block diagram illustrating a configuration of an image decoding apparatus including a post-processor, according to an embodiment.

FIG. 17 is a block diagram illustrating a configuration of an image decoding apparatus including a post-processor, according to an embodiment.

Referring to FIG. 17, an image decoding apparatus 1700 includes an entropy-decoder 1710, a re-aligner 1720, an inverse-quantizer 1730, an inverse-transformer 1740, an adder 1745, a motion compensator 1750, an intra predictor 1760, a filter 1770, and a post-processor 1780.

The entropy-decoder 1710 receives a compressed bitstream, and performs entropy decoding, thereby extracting post-processing calculation mode information used in generating prediction mode information of a current block and a second prediction block.

The image decoding apparatus 1700 according to an embodiment may obtain, from a bitstream, and use weight parameter information used in generating the second prediction block. The weight parameter information (or parameter index information) may be included in the bitstream related with various data units. For example, the image decoding apparatus 1700 may use the parameter index information included in a sequence parameter set, a picture parameter set, a video parameter set, a slice header, and a slice segment header.

Furthermore, the image decoding apparatus 1700 may obtain, from the bitstream, and use syntax corresponding to the parameter index information according to each largest coding unit, each reference coding unit, and each prediction unit.

The entropy-decoder 1710 according to an embodiment performs entropy decoding on texture data, thereby extracting a quantized transformation coefficient of a current block. The inverse-quantizer 1730 and the inverse-transformer 1740 performs inverse quantization and inverse transformation on the quantized transformation coefficient, thereby reconstructing residual corresponding to a difference between the current block and the second prediction block. The motion compensator 1750 and the intra predictor 1760 outputs a prediction block by generating the prediction block based on the prediction mode of the current block. When the current block is encoded by using the second prediction block generated by the post-processor 1240 of FIG. 12, the post-processor 1780 generates the second prediction block by changing each pixel value of the first prediction block generated by the intra predictor 1760 based on post-processing calculation information extracted from the bitstream. An operation of the post-processor 1780 of the image decoding apparatus 1700 is equal to an operation of the post-processor 1240 of FIG. 12 in that the second prediction block is generated based on the post-processing calculation information extracted from the bitstream.

The adder 1745 adds the reconstructed residual to prediction blocks generated by the motion compensator 1750 and the intra predictor 1760, thereby reconstructing the current block. In particular, when the current block to be decoded was encoded based on the second prediction block according to the embodiments, the adder 1745 adds the reconstructed residual to the second prediction block generated by the post-processor 1780, thereby reconstructing the current block. The decoded block is stored in a predetermined memory via the filter 1770 and then is used as reference data in decoding a next block.

Figure 18:
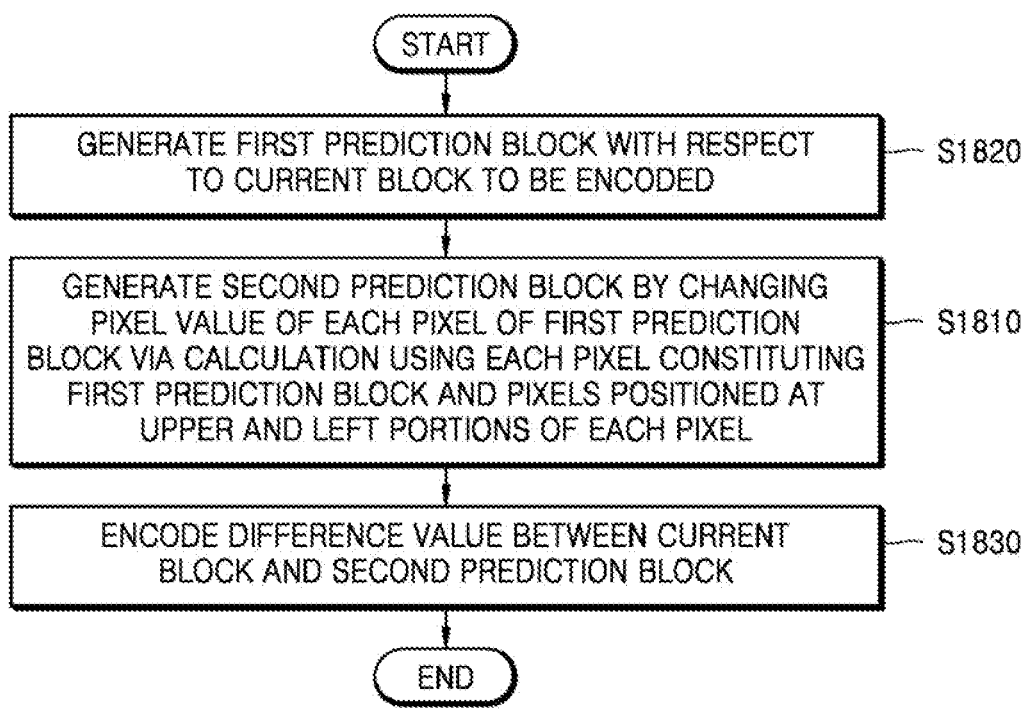
FIG. 18 is a flowchart illustrating an image encoding method, according to an embodiment.

FIG. 18 is a flowchart illustrating an image encoding method, according to an embodiment.

Referring to FIG. 18, in operation S1810, a first prediction block with respect to a current block to be encoded is generated. In this regard, the first prediction block is an intra prediction block that is generated by using a general intra prediction method.

In operation S1820, a second prediction block is generated by changing a pixel value of each pixel of the first prediction block via a calculation using each pixel constituting the first prediction block and pixels positioned at upper and left portions of each pixel. As described above in the embodiment of the post-processor 1240, the second prediction block is generated by changing the pixel value of each pixel of the first prediction block by using a calculation in which a weight is applied to upper and left pixels with respect to a pixel to be changed in the first prediction block.

In operation S1830, residual that is a difference value between the current block and the second prediction block is transformed, quantized, and entropy encoded, such that a bitstream is generated. Calculation information used in generating the second prediction block is added to a predetermined region of the generated bitstream, thus, a decoding apparatus may generate the second prediction block with respect to the current block.

Figure 19:
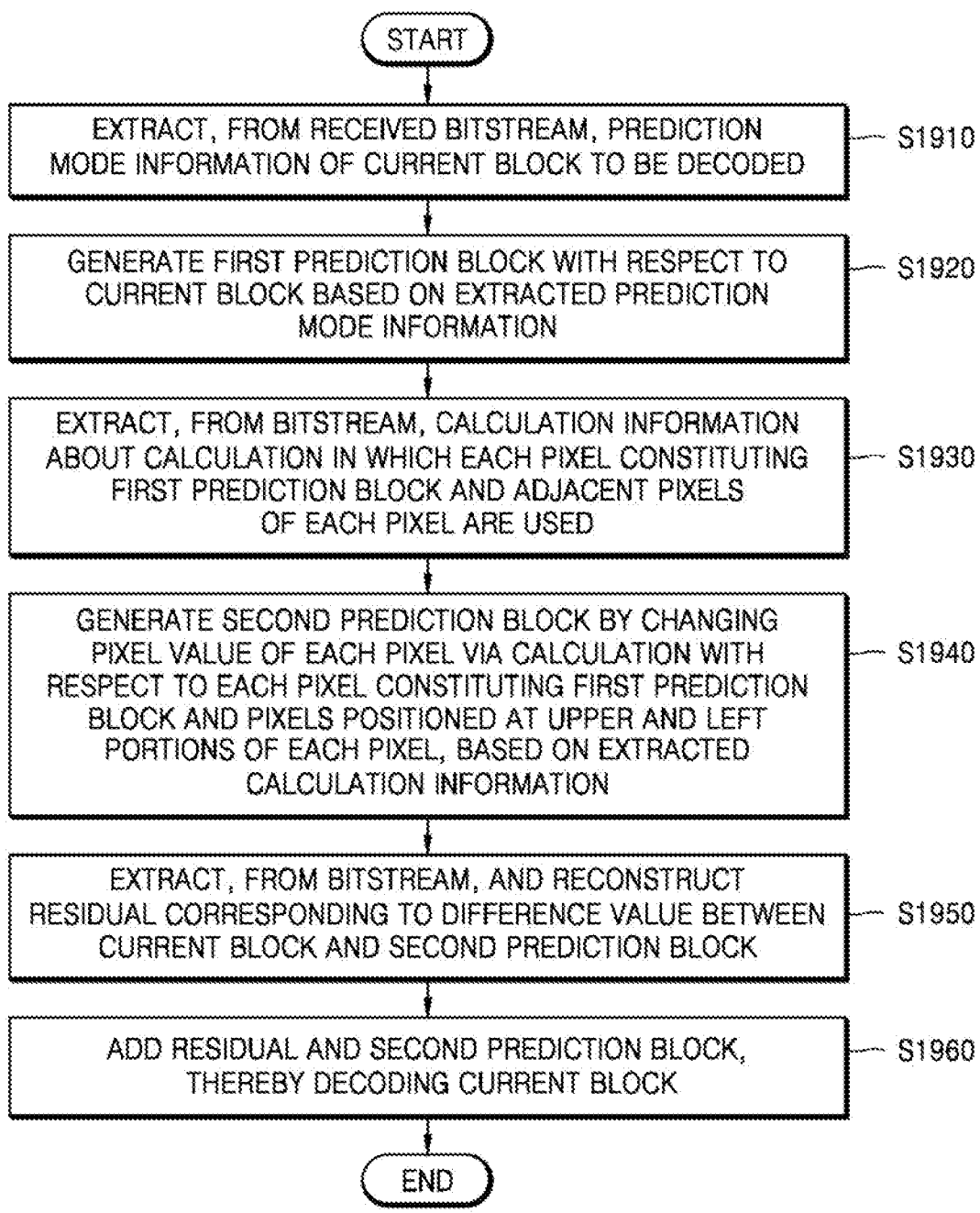
FIG. 19 is a flowchart illustrating an image decoding method, according to an embodiment.

FIG. 19 is a flowchart illustrating an image decoding method, according to an embodiment.

Referring to FIG. 19, in operation S1910, prediction mode information of a current block to be decoded is extracted from a received bitstream.

In operation S1920, a first prediction block with respect to the current block is generated based on the extracted prediction mode information.

In operation S1930, calculation information about a calculation in which each pixel constituting the first prediction block and adjacent pixels of each pixel are used is extracted from the bitstream.

In operation S1940, a second prediction block is generated by changing a pixel value of each pixel via a calculation with respect to each pixel constituting the first prediction block and pixels positioned at upper and left portions of each pixel, based on the extracted calculation information.

In operation S1950, residual corresponding to a difference value between the current block and the second prediction block is extracted from the bitstream and then is reconstructed.

In operation S1960, the residual and the second prediction block are added such that the current block is decoded.

Hereinafter, with reference to FIGS. 20 through 28, a method of performing motion compensation by a block unit and a pixel unit according to an embodiment will now be described.

Figure 20:
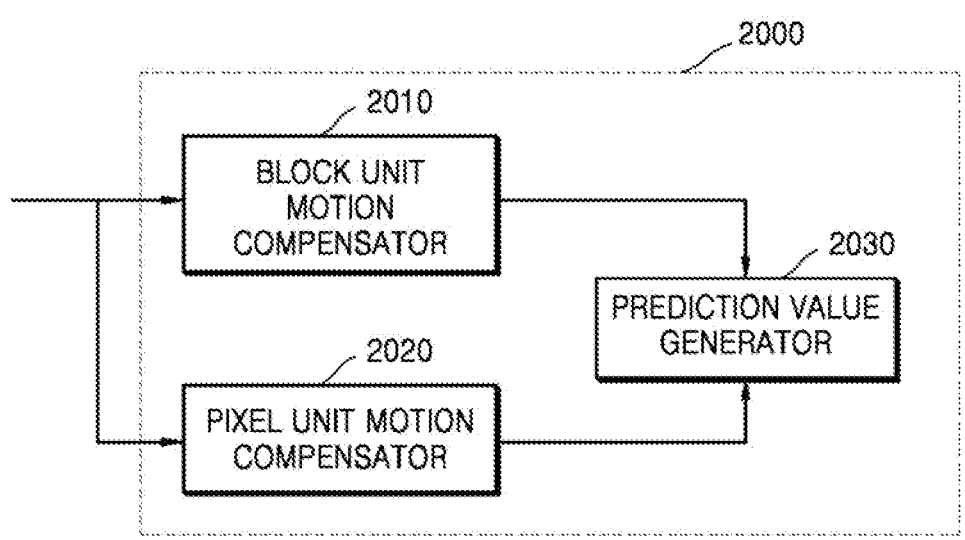
FIG. 20 is a block diagram illustrating a configuration of a motion compensator, according to an embodiment.

FIG. 20 is a block diagram illustrating a configuration of a motion compensator, according to an embodiment. A motion compensator 2000 of FIG. 20 may be included in the inter-predictor 115 of FIG. 1. Also, the motion compensator 2000 of FIG. 20 may be included in the inter-predictor 235 of FIG. 2.

Referring to FIG. 20, the motion compensator 2000 according to an embodiment includes a block unit motion compensator 2010, a pixel unit motion compensator 2020, and a prediction value generator 2030.

The block unit motion compensator 2010 performs block unit bi-directional motion compensation on a current block to be encoded, by using bi-directional motion vectors determined by a motion estimator (not shown) included in the inter-predictor 115 of FIG. 1 or the inter-predictor 235 of FIG. 2.

The pixel unit motion compensator 2020 additionally performs pixel unit motion compensation on each pixel of the current block that is bi-directionally motion compensated in a block unit, by using pixels of reference pictures indicated by the bi-directional motion vectors.

The prediction value generator 2030 generates a final bi-directional motion prediction value of the current block by using results of the block unit bi-directional motion compensation and pixel unit motion compensation. Hereinafter, processes of block unit bi-directional motion prediction and compensation and pixel unit bi-directional motion compensation according to embodiments will be described in detail.

Figure 21:
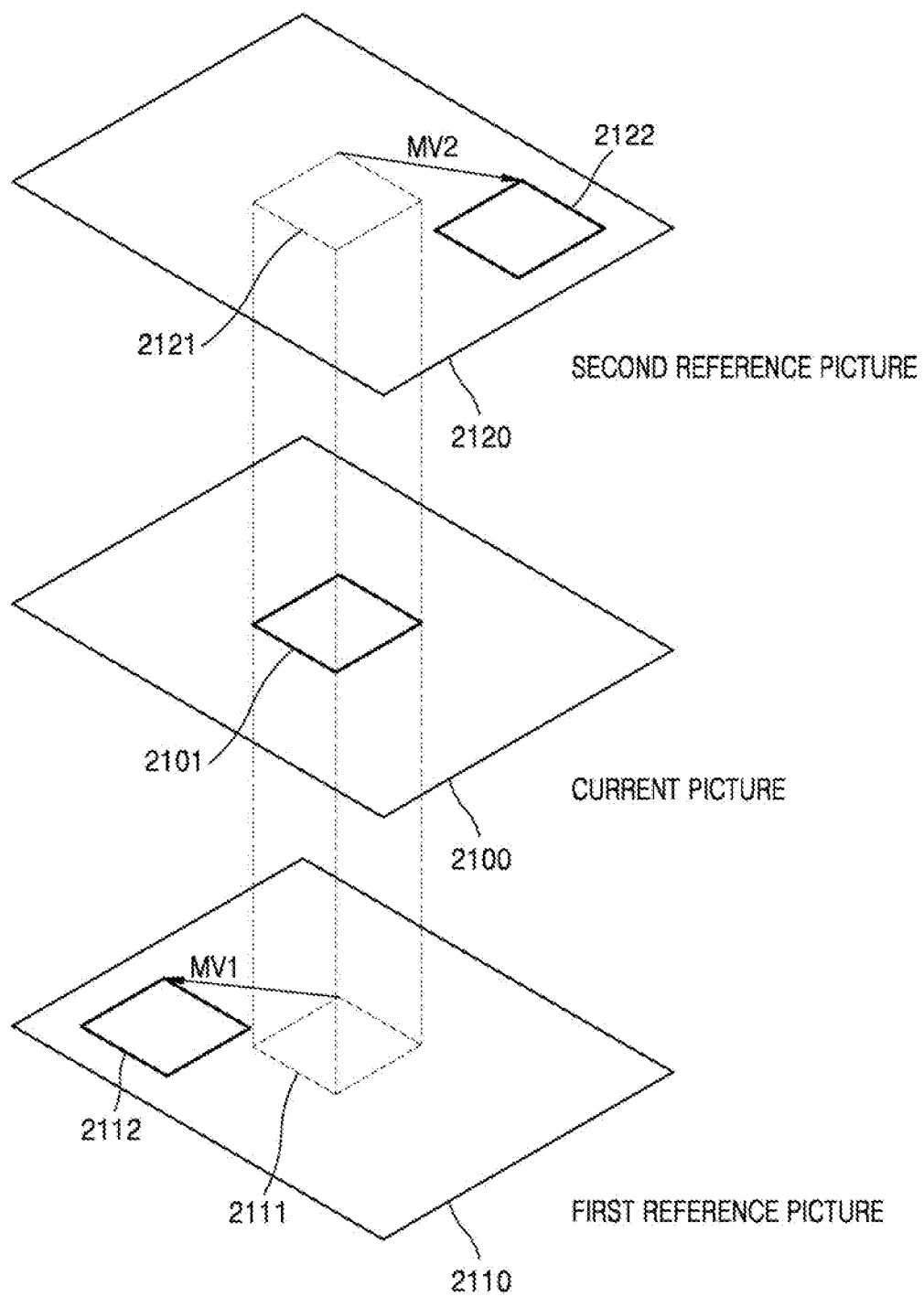
FIG. 21 is a reference diagram for describing processes of block-based bi-directional motion prediction and compensation, according to an embodiment.

FIG. 21 is a reference diagram for describing processes of block-based bi-directional motion prediction and compensation, according to an embodiment.

Referring to FIG. 21, the motion estimator (not shown) included in the inter-predictors 115 and 235 performs bi-directional motion prediction to search for a region most similar to a current block 2101 to be encoded in a current picture 2100 from a first reference picture 2110 and a second reference picture 2120. In this regard, it is assumed that the first reference picture 2110 is a previous picture of the current picture 2100 and the second reference picture 2120 is a following picture of the current picture 2100. As a result of performing the bi-directional motion prediction, a first corresponding region 2112 most similar to the current block 2101 in the first reference picture 2110 and a second corresponding region 2122 most similar to the current block 2101 in the second reference picture 2120 are determined. Also, a first motion vector MV1 based on a location difference between a block 2111 at the same location as the current block 2101 in the first reference picture 2110 and the first corresponding region 2112, and a second motion vector MV2 based on a location difference between a block 2121 at the same location as the current block 2101 in the second reference picture 2120 and the second corresponding region 2122 are determined.

The block unit motion compensator 2010 according to an embodiment performs block unit bi-directional motion compensation on the current block 2101 by using the first and second motion vectors MV1 and MV2. For example, when $P0(i,j)$ indicates a pixel value of the first reference picture 2110 located at $(i,j)$ (where i and j are each an integer), $P1(i,j)$ indicates a pixel value of the second reference picture 2120 located at $(i,j)$, MV1=(MVx1,MVy1), and MV2=(MVx2, MVy2), a block unit bi-directional motion compensation value $P\_BiPredBlock(i,j)$ of a pixel located at $(i,j)$ of the current block 2101 may be calculated according to equation, $P\_BiPredBlock(i,j)=\{P0(i+MVx1, j+MVy1)+P1(i+MVx2, j+MVy2)\}/2$. In this manner, the block unit motion compensator 2010 performs block unit motion compensation on the current block 2101 by using an average value or a weighted sum of pixels of the first and second corresponding regions 2112 and 2122 respectively indicated by the first and second motion vectors MV1 and MV2.

The pixel unit motion compensator 2020 according to an embodiment performs pixel unit motion compensation on the current block 2101 based on an optical flow of pixels of the first and second reference pictures 2110 and 2120.

An optical flow means a pattern of apparent motion of an object or surface generated due to a relative movement between an observer (eyes or a camera) and a scene. In a video sequence, the optical flow may be expressed by calculating motion between frames obtained at predetermined times t and t+Δt. I(x,y,t) denotes a pixel value located at (x,y) in the frame at the predetermined time t. That is, I(x,y,t) is a value that is spatio-temporally changed. Equation 8 below is obtained by differentiating I(x,y,t) according to time t.

$$\frac{dI}{dt} = \frac{\partial I}{\partial x}\frac{dx}{dt} + \frac{\partial I}{\partial y}\frac{dy}{dt} + \frac{\partial I}{\partial t} \qquad [\text{Equation 8}]$$

When it is assumed that a pixel value is changed according to motion with respect to a small moving region in a block but is not changed according to time, dI/dt is 0. Also, when Vx denotes a displacement vector in an x-axis direction of the pixel value I(x,y,t) and Vy denotes a displacement vector in a y-axis direction of the pixel value I(x,y,t) in dx/dt, Equation 1 may be represented according to Equation 9 below $$\frac{\partial I}{\partial t} + Vx \cdot \frac{\partial I}{\partial x} + Vy \cdot \frac{\partial I}{\partial y} = 0 \qquad [\text{Equation 9}]$$

In this regard, sizes of the displacement vector Vx in the x-axis direction and displacement vector Vy in the y-axis direction may have a value smaller than pixel accuracy used in bi-directional motion prediction. For example, when pixel accuracy is ¼ during bi-directional motion prediction, the sizes of displacement vectors Vx and Vy may have a value smaller than ¼.

The pixel unit motion compensator 2020 according to an embodiment calculates the displacement vectors Vx and Vy by using Equation 5, and performs pixel unit motion compensation by using the displacement vectors Vx and Vy. Since the pixel value I(x,y,t) is a value of an original signal in Equation 9, massive overhead may be caused during encoding when the value of the original signal is used as it is. Accordingly, the pixel unit motion compensator 2020 calculates the displacement vectors Vx and Vy by using Equation 5 by using the pixels of the first and second reference pictures determined based on the block unit bi-directional motion prediction.

Figure 22:
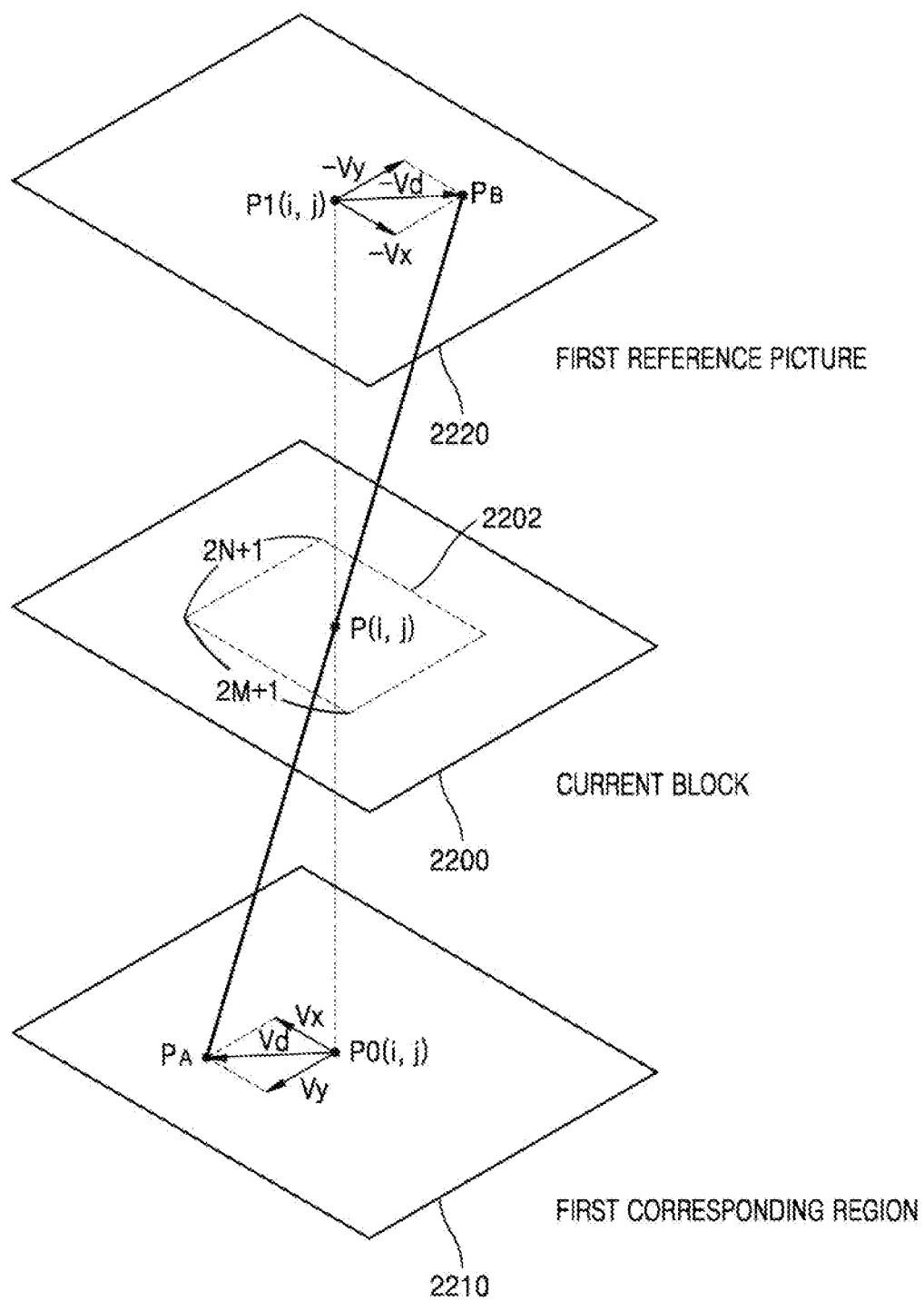
FIG. 22 is a reference diagram for describing a process of performing pixel unit motion compensation, according to an embodiment.

FIG. 22 is a reference diagram for describing a process of performing pixel unit motion compensation, according to an embodiment.

In FIG. 22, it is assumed that a first corresponding region 2210 and a second corresponding region 2220 respectively correspond to the first corresponding region 2112 and the second corresponding region 2122 of FIG. 21, and are shifted by using the first and second motion vectors MV1 and MV2 so as to overlap a current block 2200. Also, P(i,j) indicates a pixel located at (i,j) (where i and j are each an integer) bi-directionally predicted in the current block 2200, P0(i,j) indicates a pixel value of a first corresponding pixel of a first reference picture corresponding to the pixel P(i,j), and P1(i,j) indicates a pixel value of a second corresponding pixel of a second reference picture corresponding to the pixel P(i,j). In other words, the pixel value P0(i,j) of the first corresponding pixel corresponds to a pixel value of the pixel P(i,j) of the current block 2200 determined by the first motion vector MV1 indicating the first reference picture, and the pixel value P1(i,j) of the second corresponding pixel corresponds to a pixel value of the pixel P(i,j) of the current block 2200 determined by the second motion vector MV2 indicating the second reference picture.

Also, GradX0(i,j) indicates a horizontal direction gradient of the first corresponding pixel, GradY0(i,j) indicates a vertical direction gradient of the first corresponding pixel, GradX1(i,j) indicates a horizontal direction gradient of the second corresponding pixel, and GradY1(i,j) indicates a vertical direction gradient of the second corresponding pixel. Also, d0 indicates a temporal distance between a current picture of the current block 2200 and the first reference picture of the first corresponding region 2210 and d1 denotes a temporal distance between the current picture and the second reference picture of the second corresponding region 2220.

When d0 and d1 are assumed as 1, $$\frac{\partial I}{\partial t}$$

in Equation 9 may approximate to the amount of change in the pixel value P0(i,j) of the first corresponding pixel and the pixel value P1(i,j) of the second corresponding pixel according to time, as shown in Equation 10 below.

$$\frac{\partial I}{\partial t} \approx (p0(i, j) - p1(i, j))/2 \quad \text{[Equation 10]}$$

The gradients $$\frac{\partial I}{\partial x} \text{ and } \frac{\partial I}{\partial y}$$

in Equation 10 may respectively approximate to an average value of horizontal direction gradients of the first and second corresponding pixels and an average value of vertical direction gradients of the first and second corresponding pixels according to Equations 11 and 12 below.

$$\frac{\partial I}{\partial x} \approx (GradX0(i, j) + GradX1(i, j))/2 \quad \text{[Equation 11]}$$

$$\frac{\partial I}{\partial y} \approx (GradY0(i, j) + GradY1(i, j))/2 \quad \text{[Equation 12]}$$

Equation 9 may be arranged as Equation 13 below by using Equations 10 through 12.

$$P0(i,j)-P1(i,j)+Vx(i,j)\cdot(GradX0(i,j)+GradX1(i,j))+Vy(i,j)\cdot(GradY0(i,j)+GradY1(i,j))=0 \quad \text{[Equation 13]}$$

In Equation 13, since the displacement vector Vx and the displacement vector Vy may change according to a location of the current pixel P(i,j), i.e., are dependent upon (i,j), the displacement vectors Vx and Vy may also be respectively represented by Vx(i,j) and Vy(i,j).

Meanwhile, if it is assumed that there is a small uniform movement in a video sequence in FIG. 22, it is assumed that a pixel of the first corresponding region 2210 of the first reference picture most similar to the current pixel P(i,j) that is pixel unit bi-directional motion compensated is not the first corresponding pixel P0(i,j) but a first displacement corresponding pixel PA obtained by moving the first corresponding pixel P0(i,j) by a predetermined displacement vector Vd. Since it is assumed that there is the small uniform movement in the video sequence, it may be assumed that a pixel most similar to the current pixel P(i,j) in the second corresponding region 2220 of the second reference picture is a second displacement corresponding pixel PB obtained by moving the second corresponding pixel P1(i,j) by −Vd. The predetermined displacement vector Vd consists of the displacement vector Vx in the x-axis direction and the displacement vector Vy in the y-axis direction, and thus Vd= (Vx, Vy). Accordingly, the pixel unit motion compensator 2020 according to an embodiment of the present invention calculates the displacement vectors Vx and Vy forming the predetermined displacement vector Vd, and performs pixel unit motion compensation again on a value obtained via block unit bi-directional motion compensation.

The first displacement corresponding pixel PA and the second displacement corresponding pixel PB may be respectively defined according to Equations 14 and 15, by using the displacement vector Vx in the x-axis direction, the displacement vector Vy in the y-axis direction, the horizontal direction gradient GradX0(i,j) of the first corresponding pixel, the vertical direction gradient GradY0(i,j) of the first corresponding pixel, the horizontal direction gradient GradX1(i,j) of the second corresponding pixel, and the vertical direction gradient GradY1(i,j) of the second corresponding pixel.

$$PA=P0(i,j)+Vx(i,j)\cdot GradX0(i,j)+Vy(i,j)\cdot GradY0(i,j) \quad \text{[Equation 14]}$$

$$PB=P1(i,j)-Vx(i,j)\cdot GradX1(i,j)-Vy(i,j)\cdot GradY1(i,j) \quad \text{[Equation 15]}$$

When Δij indicates a difference between the first displacement corresponding pixel PA and the second displacement corresponding pixel PB, Δij may be calculated by using Equation 16 below.

$$\Delta ij=PA-PB=P0(i,j)-P1(i,j)+Vx(i,j)\cdot(GradX0(i,j)+GradX1(i,j))+Vy(i,j)\cdot(GradY0(i,j)+GradY1(i,j)) \quad \text{[Equation 16]}$$

Comparing Equations 13 and 16, Equation 13 shows a case when Δij is 0, i.e., when values of the first displacement corresponding pixel PA and the second displacement corresponding pixel PB are the same.

The pixel unit motion compensator 2020 performs pixel unit motion compensation by using an average value or weighted sum of the values of the first and second displacement corresponding pixels PA and PB of Equations 14 and 15, and at this time, in order to calculate Equations 14 and 15, the displacement vectors Vx and Vy, the horizontal direction gradients GradX0(i,j), the vertical direction gradient GradY0(i,j), the horizontal direction gradient GradX1(i,j), and the vertical direction gradient GradY1(i,j) need to be determined. As described below, a gradient of each corresponding pixel may be determined by calculating the amount of change in pixel values at a sub-pixel location in horizontal and vertical directions of the first and second corresponding pixels, or may be calculated by using a predetermined filter.

First, processes of determining the displacement vector Vx in the x-axis direction and the displacement vector Vx in the y-axis direction will be described.

The pixel unit motion compensator 2020 determines the displacement vectors Vx and Vy that minimize Δij in a window Ωij 2202 having a predetermined size and including adjacent pixels around the current pixel P(i,j) that is bi-directional motion compensated. It is preferable that Δij is 0, but since the displacement vectors Vx and Vy that satisfy Δij=0 may not exist with respect to all pixels in the window Ωij 2202, the displacement vectors Vx and Vy that minimize Δij are determined.

Figure 23:
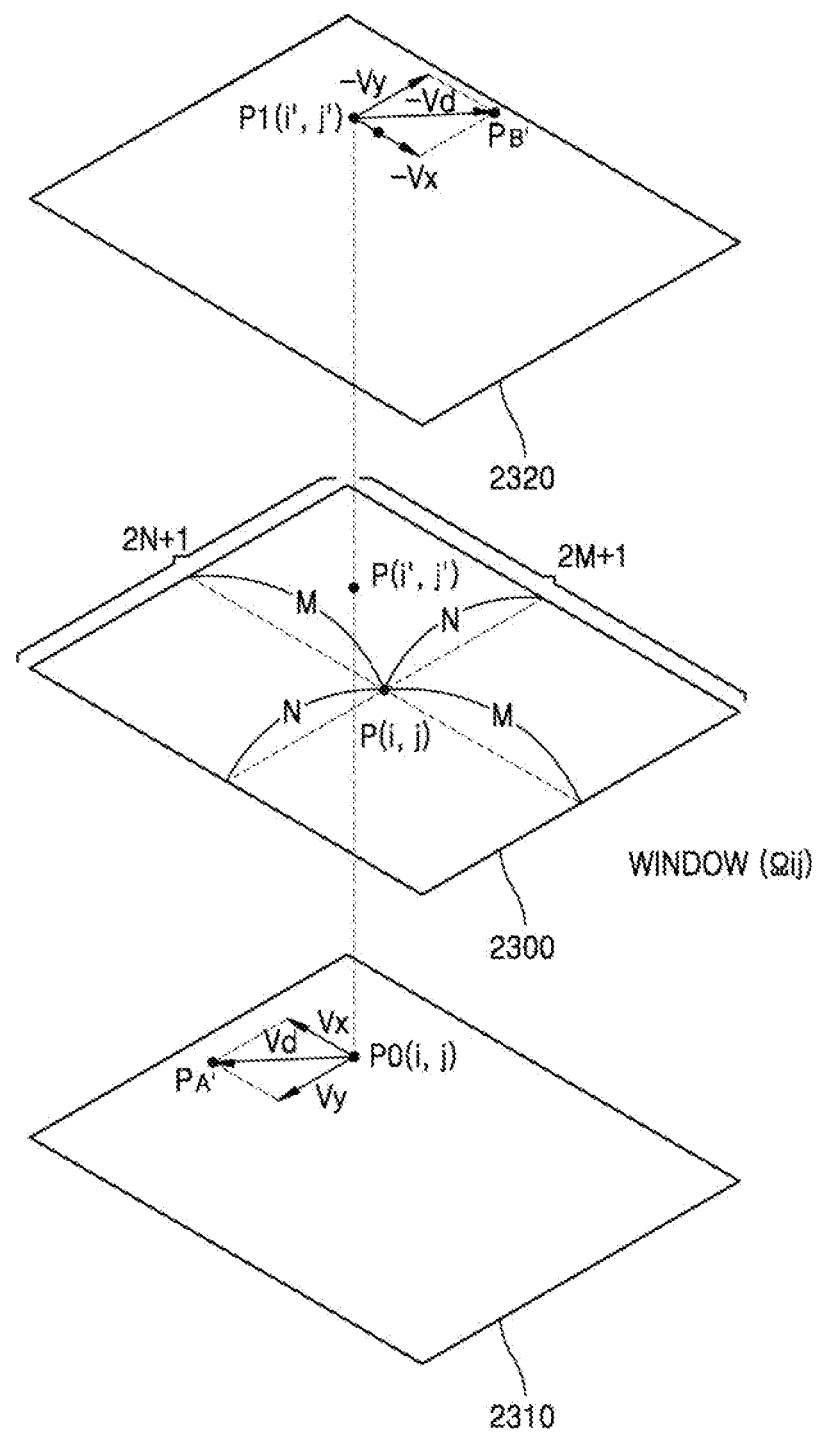
FIG. 23 is a reference diagram for describing a process of determining a horizontal direction displacement vector and a vertical direction displacement vector, according to an embodiment.

FIG. 23 is a reference diagram for describing a process of determining a horizontal-direction displacement vector and a vertical-direction displacement vector, according to an embodiment.

Referring to FIG. 23, a window Ωij 2300 has a size of (2M+1)*(2N+1) (where M and N are each an integer) based on a pixel P(i,j) of a current block that is bi-directionally predicted.

When P(i',j') indicates a pixel of a current block to be bi-directionally predicted in a window (i',j')⊂Ωij when i−M≤i'≤i+M and j−M≤j'≤j+M, P0($i',j'$) indicates a pixel value of a first corresponding pixel of a first reference picture 2310 corresponding to the pixel P(i',j') of the current block to be bi-directionally predicted, P1($i',j'$) indicates a pixel value of a second corresponding pixel of a second reference picture 2320 corresponding to the pixel P(i',j') of the current block to be bi-directionally predicted, GradX0($i',j'$) indicates a horizontal-direction gradient of the first corresponding pixel, GradY0($i',j'$) indicates a vertical-direction gradient of the first corresponding pixel, GradX1($i',j'$) indicates a horizontal-direction gradient of the second corresponding pixel, and GradY1($i',j'$) indicates a vertical-direction gradient of the second corresponding pixel, a first displacement corresponding pixel PA' has a value according to Equation, P0($i',j'$)+Vx*GradX0($i',j'$)+Vy*GradY0($i',j'$), and a second displacement corresponding pixel PB' has a value according to Equation, P1($i',j'$)−Vx*GradX1($i',j'$)−Vy*GradY1($i',j'$).

A displacement vector Vx in an x-axis direction and a displacement vector Vy in a y-axis direction, which minimize a difference Δi'j' between the first displacement corresponding pixel PA' and the second displacement corresponding pixel PB', may be determined by using a maximum or minimum value of ϕ(Vx,Vy) constituting a sum of squares of the difference Δi'j' according to Equation 17 below.

$$\Phi(Vx, Vy) = \sum_{i',j' \in \Omega_{ij}} \Delta_{i'j'}^2 \qquad \text{[Equation 17]}$$

$$= \sum_{i',j' \in \Omega_{ij}} (P0(i', j') - P1(i', j') + Vx(i, j) \cdot (GradX0(i', j') + GradX1(i', j')) + Vy(i, j) \cdot (GradY0(i', j') + GradY1(i', j')))^2$$

ϕ(Vx,Vy) is a function using Vx and Vy as parameters, and the maximum or minimum value may be determined by calculating Vx and Vy that make the value of partial differentiated ϕ(Vx,Vy) with respect to Vx and Vy to be 0 according to Equations 18 and 19 below.

$$\frac{\partial \Phi(Vx, Vy)}{\partial Vx} = \qquad \text{[Equation 18]}$$

$$\sum_{i',j' \in \Omega_{ij}} [2Vx(i, j) \cdot (GradX0(i', j') - GradX1(i', j'))^2 -$$

$$2(GradX0(i', j') - GradX1(i', j')) \cdot (P0(i', j') - P1(i', j')) -$$

$$2(GradX0(i', j') - GradX1(i', j')) \cdot$$

$$Vy(i, j) \cdot (GradY0(i', j') - GradY1(i', j'))] = 0$$

$$\frac{\partial \Phi(Vx, Vy)}{\partial Vy} = \qquad \text{[Equation 19]}$$

$$\sum_{i',j' \in \Omega_{ij}} [2Vy(i, j) \cdot (GradY0(i', j') + GradY1(i', j'))^2 +$$

$$2(GradY0(i', j') + GradY1(i', j')) \cdot (P0(i', j') - P1(i', j')) +$$

$$2(GradY0(i', j') + GradY1(i', j')) \cdot Vx(i, j) \cdot$$

$$(GradX0(i', j') + GradX1(i', j'))] = 0$$

Two linear equations using Vx(i,j) and Vy(i,j) as variables may be obtained as in Equation 20 below from Equations 18 and 19.

$$Vx(i,j) \cdot s1 + Vy(i,j) \cdot s2 = s3;$$

$$Vx(i,j) \cdot s4 + Vy(i,j) \cdot s5 = s6 \qquad \text{[Equation 20]}$$

s1 through s6 in Equation 20 are calculated by using Equation 21 below.

$$s1 = \sum_{i',j' \in \Omega_{ij}} (GradX0(i', j') + GradX1(i', j'))^2 \qquad \text{[Equation 21]}$$

$$s2 = s4 =$$

$$\sum_{i',j' \in \Omega_{ij}} (GradX0(i', j') + GradX1(i', j'))(GradY0(i', j') + GradY'(i', j'))$$

$$s3 = -\sum_{i',j' \in \Omega_{ij}} (P0(i', j') - P'(i', j'))(GradX0(i', j') + GradX1(i', j'))$$

$$s5 = \sum_{i',j' \in \Omega_{ij}} (GradY0(i', j') + GradY1(i', j'))^2$$

$$s6 = \sum_{i',j' \in \Omega_{ij}} (P0(i', j') - P'(i', j'))(GradY0(i', j') + GradY'(i', j'))$$

When simultaneous equations of Equation 21 are solved, values of Vx(i,j) and Vy(i,j) may be obtained according to Vx(i,j)=det1/det and Vy(i,j)=det2/det based on Kramer's formulas. In this regard, det1=s3*s5−s2*s6, det2=s1*s6−s3*s4, and det=s1*s5−s2*s4.

Referring back to FIG. 20, the prediction value generator 2030 generates a bi-directional motion prediction value by adding a block unit bi-directional motion compensation value and a pixel unit motion compensation value. In more detail, when P_OpticalFlow(i,j) indicates a bi-directional motion prediction value of a pixel located at (i,j) of a current block, P0($i,j$) indicates a pixel value of a first corresponding pixel of a first reference picture corresponding to the pixel located at (i,j) of the current block, GradX0($i,j$) indicates a horizontal direction gradient of the first corresponding pixel of the first reference picture, GradY0($i,j$) indicates a vertical direction gradient of the first corresponding pixel of the first reference picture, P1($i,j$) indicates a pixel value of a second corresponding pixel of a second reference picture corresponding to the pixel located at (i,j) of the current block, GradX1(i,j) indicates a horizontal direction gradient of the second corresponding pixel of the second reference picture, GradY1(i,j) indicates a vertical direction gradient of the second corresponding pixel of the second reference picture, Vx indicates a horizontal direction displacement vector, and Vy indicates a vertical direction displacement vector, the prediction value generator 2030 generates the bi-directional motion prediction value by using Equation 22 below.

$$P_{OpticalFlow(i,j)} = \frac{P0(i,j) + P1(i,j)}{2} + (Vx \cdot (GradX0(i,j) - GradX1(i,j)) + Vy \cdot (GradY0(i,j) - GradY1(i,j)))/2 \quad [\text{Equation 22}]$$

In Equation 22, (P0(i,j)+P1(i,j))/2 corresponds to a block unit bi-directional motion compensation value and (Vx*(GradX0(i,j)−GradX1(i,j))+Vy*(GradY0(i,j)−GradY1(i,j)))/2 corresponds to a pixel unit motion compensation value calculated according to an embodiment.

Equation 22 may be modified to Equation 23 below by multiplying a predetermined weight a to the pixel unit motion compensation value.

$$P_{OpticalFlow(i,j)} = \frac{P0(i,j) + P1(i,j)}{2} + (aVx \cdot (GradX0(i,j) - GradX1(i,j)) + aVy \cdot (GradY0(i,j) - GradY1(i,j)))/2 \quad [\text{Equation 23}]$$

Here, the weight a may be smaller than 1, preferably, α=0.56±0.05.

Equation 16 above is calculated assuming that a temporal distance d0 between the current picture and the first reference picture and a temporal distance d1 between the current picture and the second reference picture are both 1. If d0 and d1 are not 1, a size of the predetermined displacement vector Vd may be scaled in inverse proportion to d0 and d1. That is, when (Vx0, Vy0) indicates a displacement vector of a first reference picture indicating a first displacement corresponding pixel in a first corresponding pixel and (Vx1, Vy1) indicates a displacement vector of a second reference picture indicating a second displacement corresponding pixel in a second corresponding pixel, d0*Vx1=−d1*Vx0 and d0*Vy1=−d1*Vy0. The displacement vectors Vx and Vy may be calculated by calculating maximum and minimum values by partial differentiating a function φ(Vx,Vy) with respect to the displacement vectors Vx and Vy when d=d1/d0. As described above, Vx(i,j)=det1/det, Vy(i,j)=det2/det, det1=s3*s5−s2*s6, det2=s1*s6−s3*s4, and det=s1*s5−s2*s4. Here, values of s1 through s6 are calculated according to Equation 24 below.

$$s1 = \sum_{i',j' \in \Omega ij} (GradX0(i',j') + d \cdot GradX1(i',j'))^2 \quad [\text{Equation 24}]$$

$$s2 = s4 = \sum_{i',j' \in \Omega ij} (GradX0(i',j') + d \cdot GradX1(i',j'))$$

$$(GradY0(i',j') + d \cdot GradY'(i',j')$$

$$s3 = -\sum_{i',j' \in \Omega ij} (P0(i',j') - P'(i',j'))(GradX0(i',j') + d \cdot GradX1(i',j'))$$

-continued $$s5 = \sum_{i',j' \in \Omega ij} (GradY0(i',j') + d \cdot GradY1(i',j'))^2$$

$$s6 = \sum_{i',j' \in \Omega ij} (P0(i',j') - P'(i',j'))(GradY0(i',j') + d \cdot GradY'(i',j'))$$

Also, when the temporal distance d0 and the temporal distance d1 are not 1, Equation 23 is modified to Equation 25, and the prediction value generator 2030 generates the bi-directional motion compensation value by using Equation 25.

$$P_{OpticalFlow(i,j)} = \frac{P0(i,j) + P1(i,j)}{2} + \quad [\text{Equation 25}]$$
$$(aVx \cdot (GradX0(i,j) - d \cdot GradX1(i,j)) + aVy \cdot (GradY0(i,j) - d \cdot GradY1(i,j)))/2$$

Meanwhile, the optical flow of Equation 9 described above is based on the assumption that the amount of change in pixel values according to time is 0, but a pixel value may change according to time. When q indicates the amount of change in pixel values according to time, Equation 9 is modified to Equation 26 below.

$$\frac{\partial I}{\partial t} + Vx \cdot \frac{\partial I}{\partial x} + Vy \cdot \frac{\partial I}{\partial y} = q \quad [\text{Equation 26}]$$

In this regard, q indicates an average of differences of pixel values in first and second corresponding regions, and may be calculated by using Equation 27 below.

$$q = \frac{\sum_{i,j \in block} P1(i,j) - P0(i,j)}{2 \cdot \text{Hor\_block\_Size} \cdot \text{ver\_block\_Size}} \quad [\text{Equation 27}]$$

Hor_block_size indicates a horizontal direction size of a current block and ver_block_size indicates a vertical direction size of the current block. When the displacement vectors Vx and Vy are calculated by using a value of P1(i,j)−q considering the amount of change q, instead of P1(i,j) in Equations 14 through 25, Vx(i,j)=det1/det, Vy(i,j)=det2/det, det1=s3*s5−s2*s6, det2=s1*s6−s3*s4, and det=s1*s5−s2*s4. Here, values of s1 through s6 are calculated according to Equation 28 below.

$$s1 = \sum_{i',j' \in \Omega ij} (GradX0(i',j') + d \cdot GradX1(i',j'))^2 \quad [\text{Equation 28}]$$

$$s2 = s4 = \sum_{i',j' \in \Omega ij} (GradX0(i',j') + d \cdot GradX1(i',j'))$$

$$(GradY0(i',j') + d \cdot GradY'(i',j')$$

$$s3 = -\sum_{i',j' \in \Omega ij} (P0(i',j') - P'(i',j') - q)(GradX0(i',j') + d \cdot GradX1(i',j'))$$

$$s5 = \sum_{i',j' \in \Omega ij} (GradY0(i',j') + d \cdot GradY1(i',j'))^2$$

$$s6 = \sum_{i',j' \in \Omega ij} (P0(i',j') - P'(i',j') - q)(GradY0(i',j') + d \cdot GradY'(i',j'))$$

Here, the prediction value generator 2030 may also generate the bi-directional motion compensation value according to Equation 25 above.

As described above, horizontal and vertical direction gradients may be obtained by calculating the amount of change at a sub-pixel location in horizontal and vertical directions of first and second corresponding pixels, or by using a predetermined filter.

Figure 24:
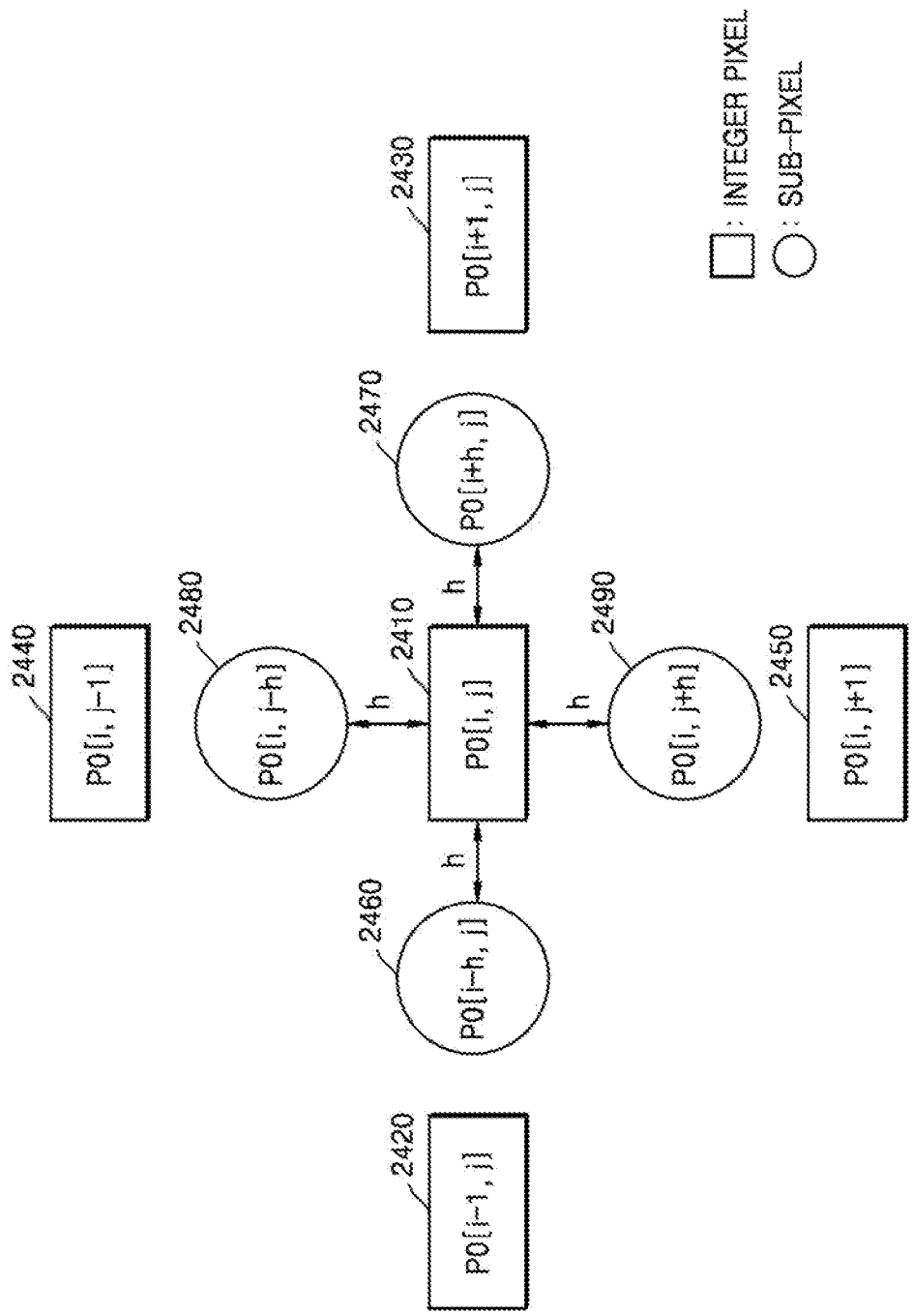
FIG. 24 is a reference diagram for describing a process of calculating horizontal and vertical direction gradients, according to an embodiment.

FIG. 24 is a reference diagram for describing a process of calculating horizontal and vertical direction gradients, according to an embodiment. Referring to FIG. 24, a horizontal direction gradient GradX0($i,j$) and a vertical direction gradient GradY0($i,j$) of a first corresponding pixel P0($i,j$) 2410 of a first reference picture may be calculated by respectively obtaining the amount of change in pixel values at adjacent sub-pixel locations in a horizontal direction of the first corresponding pixel P0($i,j$) 2410 and the amount of change in pixel values at adjacent sub-pixel locations in a vertical direction. That is, the horizontal direction gradient GradX0($i,j$) may be calculated by calculating the amount of change in pixel values of a sub-pixel P0($i-h,j$) 2460 and a sub pixel P0($i+h,j$) 2470 distant from the first corresponding pixel P0($i,j$) 2410 by h (where h is a fraction smaller than 1) in a horizontal direction, and the vertical direction gradient GradY0($i,j$) may be calculated by calculating the amount of change in pixel values of a sub-pixel P0($i,j-h$) 2480 and a sub pixel P0($i,j+h$) 2490 distant from the first corresponding pixel P0($i,j$) 1710 by h in a vertical direction, by using Equation 29 below.

$$GradX0(i, j) = \frac{P0(i+h, j) - P0(i-h, j)}{2h};$$
$$GradY0(i, j) = \frac{P0(i, j+h) - P0(i, j-h)}{2h}$$
[Equation 29]

Values of the sub-pixels P0($i-h,j$) 2460, P0($i+h,j$) 2470, P0($i,j-h$) 2480, and P0($i,j+h$) 2490 may be calculated by using a general interpolation method. Also, gradients of a second corresponding pixel of a second reference picture may be calculated in a similar manner as Equation 29.

According to an embodiment, a gradient of each corresponding pixel may be calculated by using a predetermined filter, instead of calculating the amount of change in pixel values at sub-pixel locations according to Equation 29.

Figure 25:
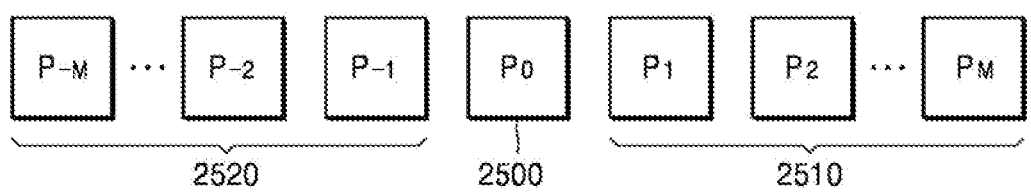
FIG. 25 is a reference diagram for describing a process of calculating horizontal and vertical direction gradients, according to another embodiment.

FIG. 25 is a reference diagram for describing a process of calculating horizontal and vertical direction gradients, according to another embodiment, and FIG. 26 is a table showing filter coefficients of a gradient calculating filter, according to another embodiment.

According to the other embodiment, a gradient may be determined by applying a predetermined filter to pixels of a reference picture. Referring to FIG. 25, a horizontal direction gradient of a corresponding pixel P0 2500 may be calculated by applying a predetermined pixel on M pixels 2520 to the left of the corresponding pixel P0 2500 and M pixels 2510 to the right of the corresponding pixel P0 2500. A filter coefficient used at this time may be determined according to a value of M used to determine a size of a window and a value of α indicating an interpolation location between integer pixels, as shown in FIG. 26. For example, when 2M=4 and a sub-pixel is distant from the corresponding pixel P0 2500 by ¼, i.e., α=¼, filter coefficients {−8. −36. 54, −10} on a second row of FIG. 26 are applied to adjacent pixels P-2, P-1, P1, and P2. Here, a horizontal direction gradient GradX0 of the corresponding pixel P0 2500 may be calculated based on a weighted sum of a filter coefficient and an adjacent pixel, according to equation, GradX0=−8*P-2, −36*P-1+54*P1−10*P2+128>>8. Similarly, a vertical direction gradient is also calculated by applying filter coefficients of FIG. 26 to adjacent pixels according to a size 2N of a window and an interpolation location. Here, 2M of FIG. 26 may be replaced by 2N.

An operation of pixel unit motion compensation according to an embodiment may be limited by a predetermined condition. The pixel unit motion compensation according to an embodiment may be performed based on a block size. For example, when the block size is smaller than a predetermined size, the pixel unit motion compensation may not be performed.

The image decoding apparatus 200 according to an embodiment may limit the performing of the pixel unit motion compensation due to another syntax element. For example, when a coded block flag (CBF) is not 0, the pixel unit motion compensation may not be performed. Also, when the image decoding apparatus 200 performs prediction by using an AMVP mode in which a motion vector prediction value is derived from an adjacent block, or a merge mode in which a reference direction, a reference picture index, and a motion vector prediction value are derived from the adjacent block, the performing of the pixel unit motion compensation may be limited. Also, for example, even when local illumination compensation is performed or affine motion compensation is performed, the pixel unit motion compensation may not be performed.

Thus, the image decoding apparatus 200 may determine whether to perform the pixel unit motion compensation, based on a coded block flag (CBF), a syntax element indicating whether to perform motion compensation (e.g., an AMVP mode and a merge mode) by using derived motion information, a syntax element indicating whether to perform local illumination compensation, a syntax element indicating whether to perform affine motion compensation, or the like. In this regard, the CBF, the information indicating whether to perform motion compensation by using derived motion information, the information indicating whether to perform local illumination compensation, and the information indicating whether to perform affine motion compensation may be information indicating information denoting whether the pixel unit motion compensation is limited.

Figure 27:
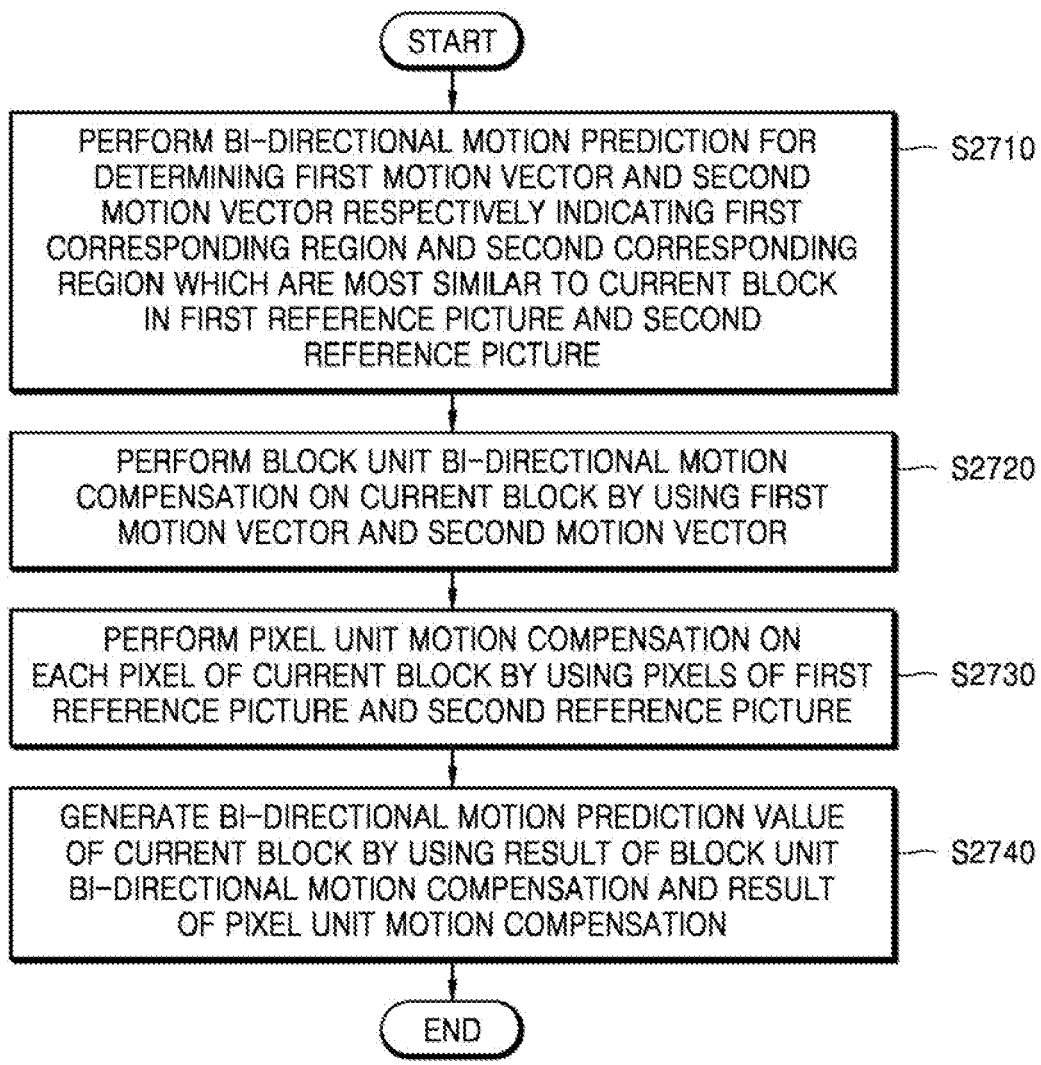
FIG. 27 is a flowchart of an image encoding method, according to an embodiment.

FIG. 27 is a flowchart of an image encoding method, according to an embodiment.

Referring to FIG. 27, in operation S2710, the image encoding apparatus 100 performs bi-directional motion prediction for determining a first motion vector and a second motion vector respectively indicating a first corresponding region and a second corresponding region which are most similar to a current block in a first reference picture and a second reference picture.

In operation S2720, the image encoding apparatus 100 performs block unit bi-directional motion compensation on the current block by using the first motion vector and the second motion vector.

In operation S2730, the image encoding apparatus 100 performs pixel unit motion compensation on each pixel of the current block by using pixels of the first reference picture and the second reference picture. As described above, the image encoding apparatus 100 may generate a pixel unit motion compensation value of each pixel of the current block by using horizontal and vertical direction gradients of a first corresponding pixel of the first reference picture corresponding to each pixel of the current block, horizontal and vertical direction gradients of a second corresponding pixel of the second reference picture corresponding to each pixel of the current block, and horizontal and vertical direction displacement vectors determined by using the pixels of the first reference picture and the second reference picture.

In operation S2740, the image encoding apparatus 100 generates a bi-directional motion prediction value of the current block by adding a result of the block unit bi-directional motion compensation and a result of the pixel unit motion compensation. A residual signal that is a difference between the predicted bi-directional motion prediction value and an original input signal is then encoded in the form of a bitstream via transformation, quantization, and entropy encoding. Meanwhile, according to an embodiment, when the pixel unit motion compensation value is used, predetermined index information indicating usage or non-usage of the pixel unit motion compensation value may be added to the encoded bitstream because the pixel unit motion compensation value is different from a general bi-directional motion prediction value.

Figure 28:
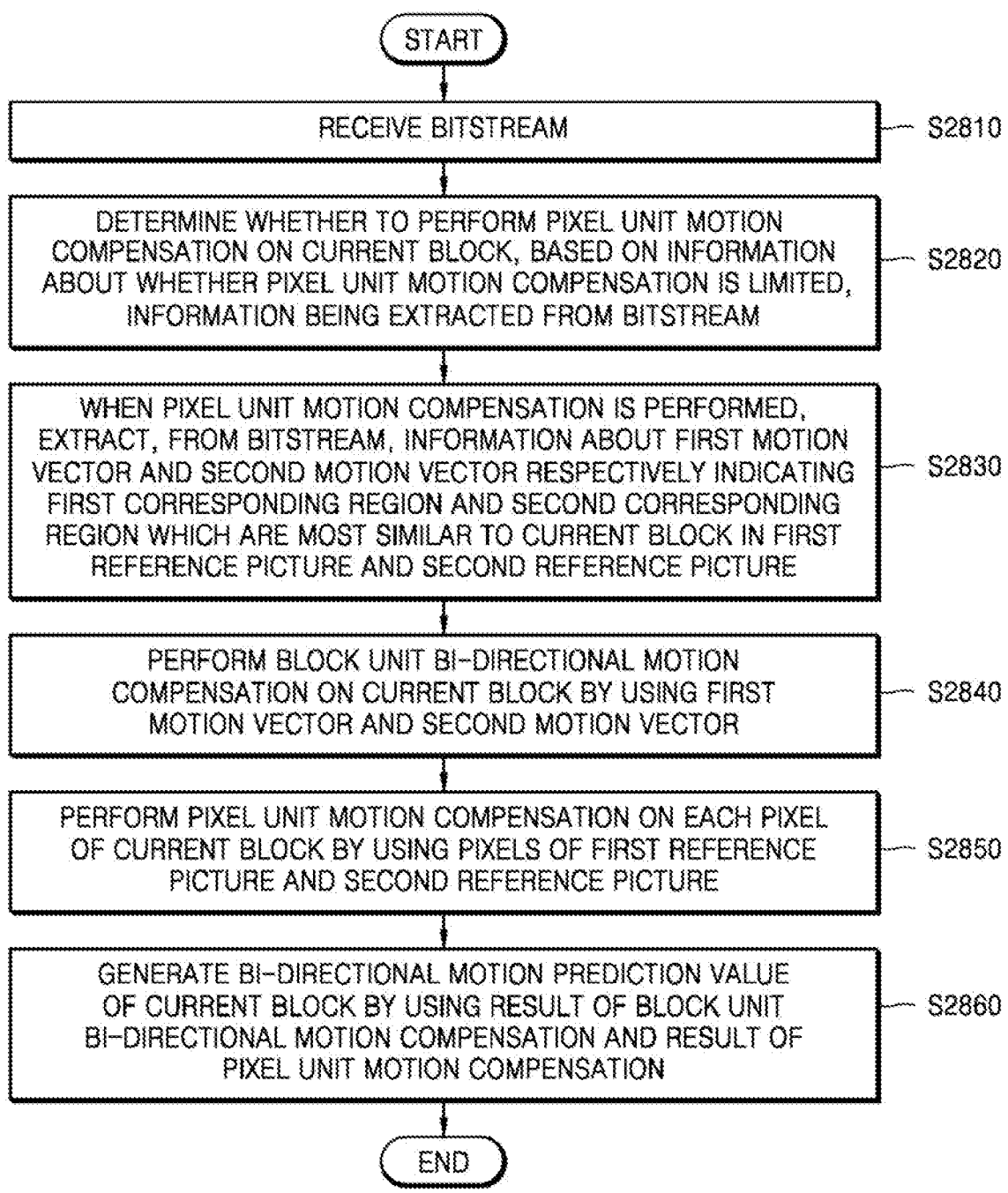
FIG. 28 is a flowchart of an image decoding method, according to an embodiment.

FIG. 28 is a flowchart of an image decoding method, according to an embodiment.

Referring to FIG. 28, in operation S2810, the image decoding apparatus 200 receives a bitstream.

In operation S2820, the image decoding apparatus 200 determines whether to perform pixel unit motion compensation on a current block, based on information about whether pixel unit motion compensation is limited, the information being extracted from the bitstream.

In operation S2830, when the pixel unit motion compensation is performed, information about a first motion vector and a second motion vector respectively indicating a first corresponding region and a second corresponding region which are most similar to the current block in a first reference picture and a second reference picture is extracted from the bitstream.

In operation S2840, the image decoding apparatus 200 performs block unit bi-directional motion compensation on the current block by using the first motion vector and the second motion vector.

In operation S2850, the image decoding apparatus 200 performs pixel unit motion compensation on each pixel of the current block by using pixels of the first reference picture and a second reference picture. As described above, the image decoding apparatus 200 may generate a pixel unit motion compensation value of each pixel of the current block by using horizontal and vertical direction gradients of a first corresponding pixel of the first reference picture corresponding to each pixel of the current block, horizontal and vertical direction gradients of a second corresponding pixel of the second reference picture corresponding to each pixel of the current block, and horizontal and vertical direction displacement vectors determined by using pixels of the first reference picture and the second reference picture.

In operation S2860, the image decoding apparatus 200 generates a bi-directional motion prediction value of the current block by using a result of the block unit bi-directional motion compensation and a result of the pixel unit motion compensation. The bi-directional motion prediction value of the current block is added to a residual value of the current block, which is extracted from the bitstream and decoded, to reconstruct the current block.

While this disclosure has been particularly shown and described with reference to embodiments thereof, it will be understood by those of ordinary skill in the art that various changes in form and details may be made therein without departing from the spirit and scope of the disclosure as defined by the appended claims. The embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

The embodiments of the present disclosure can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

The invention claimed is:

1. An decoding method comprising:
obtaining first probability information for performing arithmetic decoding on a first bin regarding a first syntax element based on a first probability model and a second probability model;
obtaining the first bin regarding the first syntax element by performing arithmetic decoding based on the obtained first probability information;
obtaining a value of the first syntax element corresponding to a first bin string including the first bin;
obtaining second probability information for performing arithmetic decoding for a second bin regarding a second syntax element, based on a third probability model and a fourth probability model;
obtaining the second bin regarding the second syntax element by performing arithmetic decoding based on the obtained second probability information; and
obtaining a value of the second syntax element corresponding to a second bin string including the second bin,
wherein the first probability model is determined based on a first bit-shift value, the second probability model is determined based on a second bit-shift value, the first bit-shift value is determined based on a first shift index, and the second bit-shift value is determined based on the first bit-shift value and the first shift index, wherein the third probability model is determined based on a third bit-shift value, the fourth probability model is determined based on a fourth bit-shift value, the third bit-shift value is determined based on a third shift index, and the fourth bit-shift value is determined based on the third bit-shift value and the third shift index.

2. An encoding method comprising:
obtaining a first bin string by binarizing a value of a first syntax element;
obtaining first probability information for performing arithmetic encoding on a first bin among the first bin string regarding the first syntax element based on a first probability model and a second probability model;
obtaining a first bitstring regarding the first syntax element by performing arithmetic encoding on the first bin based on the obtained first probability information;
obtaining a second bin string by binarizing a value of a second syntax element;
obtaining second probability information for performing arithmetic encoding on a second bin among the second bin string regarding the second syntax element based on a third probability model and a fourth probability model; and
obtaining a second bitstring regarding the second syntax element by performing arithmetic encoding on the second bin based on the obtained second probability information, wherein the first probability model is determined based on a first bit-shift value, the second probability model is determined based on a second bit-shift value, the first bit-shift value is determined based on a first shift index and the second bit-shift value is determined based on the first bit-shift value and the first shift index, wherein the third probability model is determined based on a third bit-shift value, the fourth probability model is determined based on a fourth bit-shift value, the third bit-shift value is determined based on a third shift index and the fourth bit-shift value is determined based on the third bit-shift value and the third shift index.

\* \* \* \* \*